US012114293B2

(12) United States Patent
Iyer et al.

(10) Patent No.: US 12,114,293 B2
(45) Date of Patent: Oct. 8, 2024

(54) BEAM BASED DOWNLINK CONTROL SIGNALING

(71) Applicant: InterDigital Patent Holdings, Inc., Wilmington, DE (US)

(72) Inventors: Lakshmi R. Iyer, King of Prussia, PA (US); Guodong Zhang, Woodbury, NY (US); Qing Li, Princeton Junction, NJ (US); Allan Y. Tsai, Boonton, NJ (US); Yifan Li, Conshohocken, PA (US); Pascal M. Adjakple, Great Neck, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 11 days.

(21) Appl. No.: 16/622,523

(22) PCT Filed: Jun. 15, 2018

(86) PCT No.: PCT/US2018/037682
§ 371 (c)(1),
(2) Date: Dec. 13, 2019

(87) PCT Pub. No.: WO2018/232199
PCT Pub. Date: Dec. 20, 2018

(65) Prior Publication Data
US 2020/0213978 A1      Jul. 2, 2020

Related U.S. Application Data

(60) Provisional application No. 62/520,203, filed on Jun. 15, 2017.

(51) Int. Cl.
*H04W 72/04* (2023.01)
*H04L 1/1812* (2023.01)
*H04W 56/00* (2009.01)

(52) U.S. Cl.
CPC ......... *H04W 72/042* (2013.01); *H04L 1/1812* (2013.01); *H04W 56/0005* (2013.01)

(58) Field of Classification Search
CPC ............. H04W 72/042; H04W 56/005; H04W 72/1289; H04W 48/04; H04W 72/23;
(Continued)

(56) References Cited

U.S. PATENT DOCUMENTS

| 10,411,784 | B2 * | 9/2019 | Kwon | H04W 74/0833 |
| 10,411,785 | B2 * | 9/2019 | Davydov | H04B 7/088 |
| 10,624,077 | B2 * | 4/2020 | Agiwal | H04B 7/0695 |
| 10,897,295 | B2 * | 1/2021 | Cheng | H04W 72/005 |

(Continued)

FOREIGN PATENT DOCUMENTS

CN     104094662 A    10/2014

OTHER PUBLICATIONS

3GPP TSG RAN WG1 Meeting #89 R1-1707832, MediaTek Inc, "Discussion on Beam Recovery Mechanism", May 2017, 7 pages.
(Continued)

*Primary Examiner* — Hanh N Nguyen
(74) *Attorney, Agent, or Firm* — Flaster Greenberg, P.C.

(57) ABSTRACT

Disclosed herein are methods, systems, and devices that are associated with downlink (DL) control, grant free (GF) transmission, or initial access. Particularly, disclosed herein are multi beam physical downlink control channel (PDCCH) transmission mechanisms, grant free transmissions mechanisms, demodulation reference signal (DMRS) for physical broadcast channel (PBCH) mechanisms, and DMRS sequence design for new radio-channel state information-reference signal (NR-CSI-RS) and new radio-physical downlink shared channel (PDSCH) (NR-PDSCH), among other things.

20 Claims, 31 Drawing Sheets

(58) Field of Classification Search
CPC ... H04L 1/1812; H04L 5/0078; H04L 5/0053; H04B 7/0617; H04B 7/0695; H04B 7/063
See application file for complete search history.

(56) References Cited

U.S. PATENT DOCUMENTS

| | | | | |
|---|---|---|---|---|
| 10,912,111 | B2* | 2/2021 | Lee | H04L 5/0053 |
| 10,925,062 | B2* | 2/2021 | Liu | H04W 72/048 |
| 10,925,066 | B2* | 2/2021 | Davydov | H04W 56/001 |
| 2013/0286960 | A1* | 10/2013 | Li | H04B 7/0617 |
| | | | | 370/329 |
| 2015/0029996 | A1 | 1/2015 | Yuan | |
| 2016/0021641 | A1 | 1/2016 | Nogami et al. | |
| 2016/0262077 | A1 | 9/2016 | Zhang et al. | |
| 2017/0012692 | A1* | 1/2017 | Kim | H04B 7/0695 |
| 2018/0199359 | A1* | 7/2018 | Cao | H04L 5/0044 |
| 2020/0068549 | A1* | 2/2020 | Kang | H04W 16/28 |

OTHER PUBLICATIONS

AT&T: "DL Beam Management Details", 3GPP Draft; R1-1707750 DL Beam management details, 3rd Generation Partnership Project (3GPP), Mobile Competence Centre 650, Route Des Lucioles; F-06921 Sophia-Antipolis Cedex; France, vol. RAN WGI, No. Hangzhou, China; May 14, 2017, May 15, 2017-May 19, 2017.
Nokia et al., "Beam Recovery", 3GPP Draft: R1-1708905, 3rd Generation Partnership Project (3GPP), Mobile Competence Centre; 650, Route Des Lucioles; F-06921 Sophia-Antipolis Cedex; vol. RAN WG1, No. Hangzhou May 15, 2017-May 19, 2017, May 14, 2017, XP051274083.
Huawei, "Contents of group-common PDCCH," 3GPP TSG RAN WG1 Meeting #89, R1-1708146, May 15-19, 2017, pp. 1-4.
Nokia, "Beam management—QCL association between DL RS and DMRS for NR-PDCCH," Beam management—QCL association between DL RS and DMRS for NR-PDCCH, R1-1703166, Feb. 13-17, 2017, pp. 1-4.
Intel Corporation, "PDCCH transmission schemes and multi-beam operation", 3GPP TSG RAN WGI #89 R1-1707378, May 2017, 3 Pages.
Qualcomm, "Potential agreements on beam management", 3GPP TSG RAN WGI #89 R1-1709496, May 2017, 12 Pages.
Samsung, "Multi-beam Transmission for NR-PDCCH", 3GPP TSG RAN WGI #89 R1-1707987, May 2017, 7 Pages.

* cited by examiner

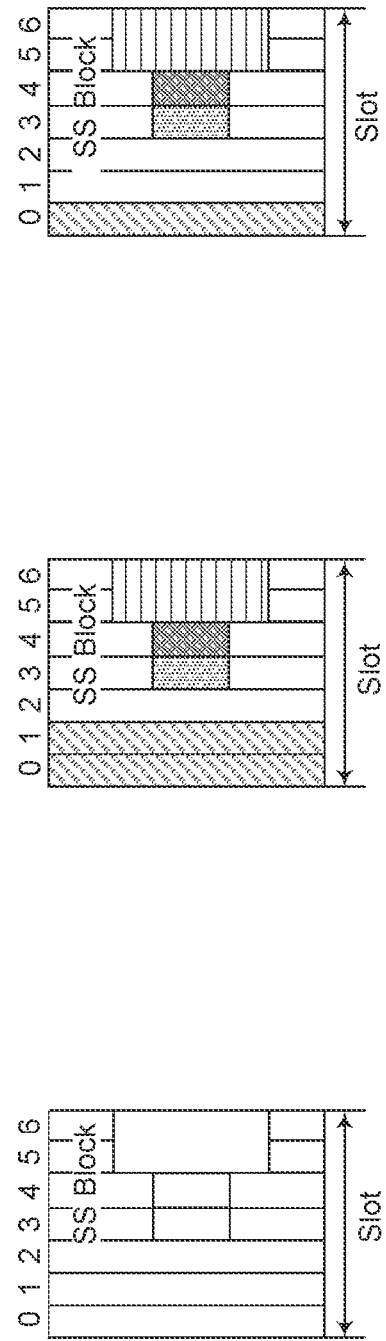

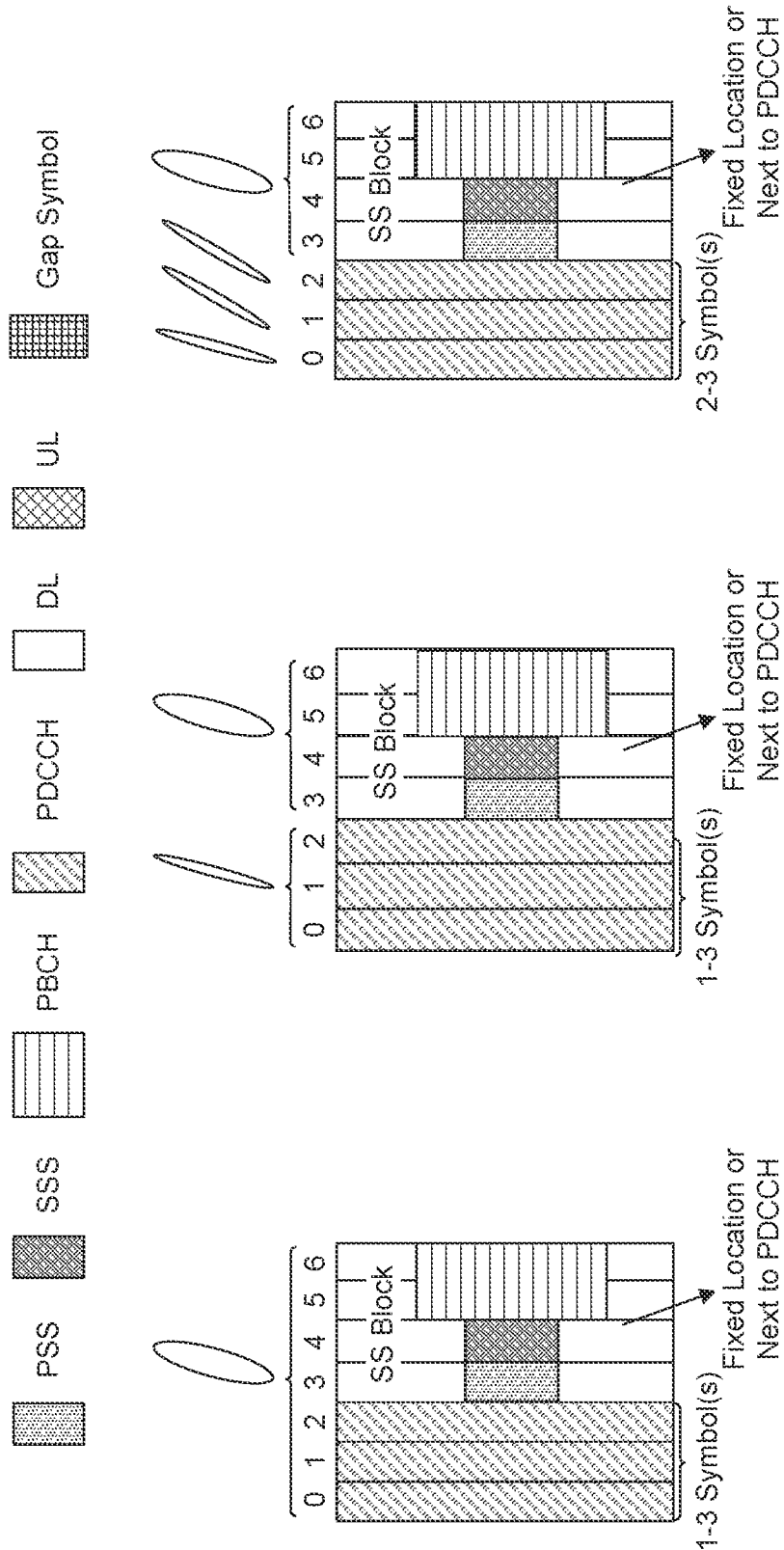

BEAM BASED DOWNLINK CONTROL SIGNALING

CROSS-REFERENCE TO RELATED APPLICATIONS

This application is the National Stage Application of International Patent Application no. PCT/US2018/037682 filed Jun. 15, 2018, which claims the benefit of U.S. Provisional Patent Application No. 62/520,203, filed Jun. 15, 2017, entitled "Beam Based Downlink Control Signaling," the contents of which are hereby incorporated by reference herein.

BACKGROUND

The following has been considered generally in the context of new radio (NR): 1) NR-PDCCH (Physical Downlink Control Channel) transmission; 2) grant free transmissions; and 3) demodulation reference signal (DMRS) for physical broadcast channel (PBCH) mechanisms (DMRS for PBCH).

NR-PDCCH transmission supports robustness against beam pair link blocking. Therefore a UE can be configured to monitor NR-PDCCH on M beam pair links simultaneously, where 1) M≥1, Maximum value of M may depend at least on UE capability; and 2) UE may choose at least one beam out of M for NR-PDCCH reception. In addition, UE can be configured to monitor NR-PDCCH on different beam pair link(s) in different NR-PDCCH Orthogonal frequency division multiplexing (OFDM) symbols, with further consideration to 1) NR-PDCCH on one beam pair link is monitored with shorter duty cycle than other beam pair link(s); 2) time granularity of configuration, e.g. slot level configuration, symbol level configuration; and 3) this configuration applies to scenario where UE may not have multiple radio frequency (RF) chains.

There may be grant free transmissions in NR. It may operate in a way in which, if a network configures UL data transmission without UL, grant can be performed after semi-static resource configuration in Radio Resource Control (RRC) without L1 signaling. And, if the network configures L1 signaling for activation/deactivation and/or modification on parameters for UL data transmission without UL, grant can be applied.

There may be DMRS for PBCH in NR. For NR-PBCH transmission, NR supports a single antenna port based transmission scheme only. Same antenna port is defined for NR-Primary Synchronization Signal (NR-PSS), NR-SSS and NR-PBCH within an SS block. Single antenna port based transmission scheme for NR-PBCH is transparent to UEs. Note that frequency domain PC is precluded.

DMRS for NR-PBCH is mapped on every NR-PBCH symbol. Frequency domain Resource Element (RE) density for DMRS may also be considered for NR.

There can be down select RE mapping scheme for the DMRS with consideration for required amount of REs for NR-PBCH. Option 1, DMRS sequence is mapped on subcarriers with equal interval. Option 2, DMRS sequence is mapped on subcarriers with unequal interval (e.g., less or no mapping within NR-SSS transmission bandwidth).

DMRS sequence depends on at least cell IDs.

SUMMARY

Disclosed herein are methods, systems, and devices that are associated with downlink (DL) control, grant free (GF) transmission, or initial access. Particularly, disclosed herein are multi beam physical downlink control channel (PDCCH) transmission mechanisms, grant free transmissions mechanisms, demodulation reference signal (DMRS) for physical broadcast channel (PBCH) mechanisms, and DMRS sequence design for new radio-channel state information-reference signal (NR-CSI-RS) and new radio-physical downlink shared channel (PDSCH) (NR-PDSCH), among other things.

In an example, multi beam PDCCH transmission mechanisms may include: 1) configuring monitoring occasions for common and user equipment (UE)-specific downlink control information (DCI); 2) configuring CORESETs (Common Resource Sets as defined by NR) for different beams; 3) indicating change in monitoring occasions due to change in Beam pair link (BPL) for cases such as semi persistent scheduling (SPS); 4) Slot structure with both PDCCH and SS block occur in the same slot; or 5) configuring quasi co-location (QCL) assumptions and indications between PDCCH and SS block.

In an example, grant free transmissions mechanisms may include: 1) enabling identification of GF uplink (UL) transmission using GF transmissions in discrete Fourier transform spread orthogonal frequency division multiplexing (DFT-s-OFDM) and Cyclic Prefix-Orthogonal frequency division multiplexing (CP-OFDM) scenarios; 2) enabling identification of a UE; 3) configuring GF UL control information; or 4) Support DCI for configuring GF UL resources dynamically.

In an example, DMRS for PBCH mechanisms may include: 1) configuring DMRS for PBCH decoding while maintaining low intra beam and intra/inter cell interference; 2) improving band edge channel estimation for PBCH through unequal distribution of DMRS; or 3) PBCH DMRS sequence design and subcarrier allocation method (e.g., using gold sequences).

Again, there are mechanisms disclosed for gold sequence based design for NR-CSI-RS and DMRS for NR-PDSCH.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 11A illustrates exemplary Slot structure of SS block location design;

FIG. 11B illustrates exemplary Slot structure of SS block location design;

FIG. 11C illustrates exemplary Slot structure of SS block location design;

FIG. 11D illustrates exemplary Slot structure of SS block location design;

FIG. 11E illustrates exemplary Slot structure of SS block location design;

FIG. 11F illustrates exemplary Slot structure of SS block location design;

FIG. 13A illustrates exemplary QCL assumptions between SS block and PDCCH;

FIG. 13B illustrates exemplary QCL assumptions between SS block and PDCCH;

FIG. 13C illustrates exemplary QCL assumptions between SS block and PDCCH;

DETAILED DESCRIPTION

As discussed in the background, considerations have been made with regard to the general use of NR-PDCCH transmission, GF transmission, and PBCH design, but certain issues with regard to implementation should be addressed. With regard to multi beam NR-PDCCH transmission, a UE should be configured to support certain beams and time intervals during which it can receive its NR-PDCCH. Disclosed herein are ways to configure a UE with a correct set of beams to ensure DCI reception. With regard to UL GF transmission, the gNB should detect the presence of a GF transmission and correctly identify the corresponding UE. Disclosed herein are mechanisms to robustly identify the UE ID. With regard to PBCH, unlike LTE no CRS may be present in NR and therefore some form of DMRS may be used to decode the PBCH after acquiring the primary synchronization signal (PSS) and secondary synchronization signal (SSS). Disclosed herein are mechanisms to aid channel estimation for PBCH. In addition, with regard to PDSCH, disclosed herein is a design for reference signal sequences to aid channel estimation for PDSCH and channel quality estimation using NR-CSI-RS.

Figure 1:
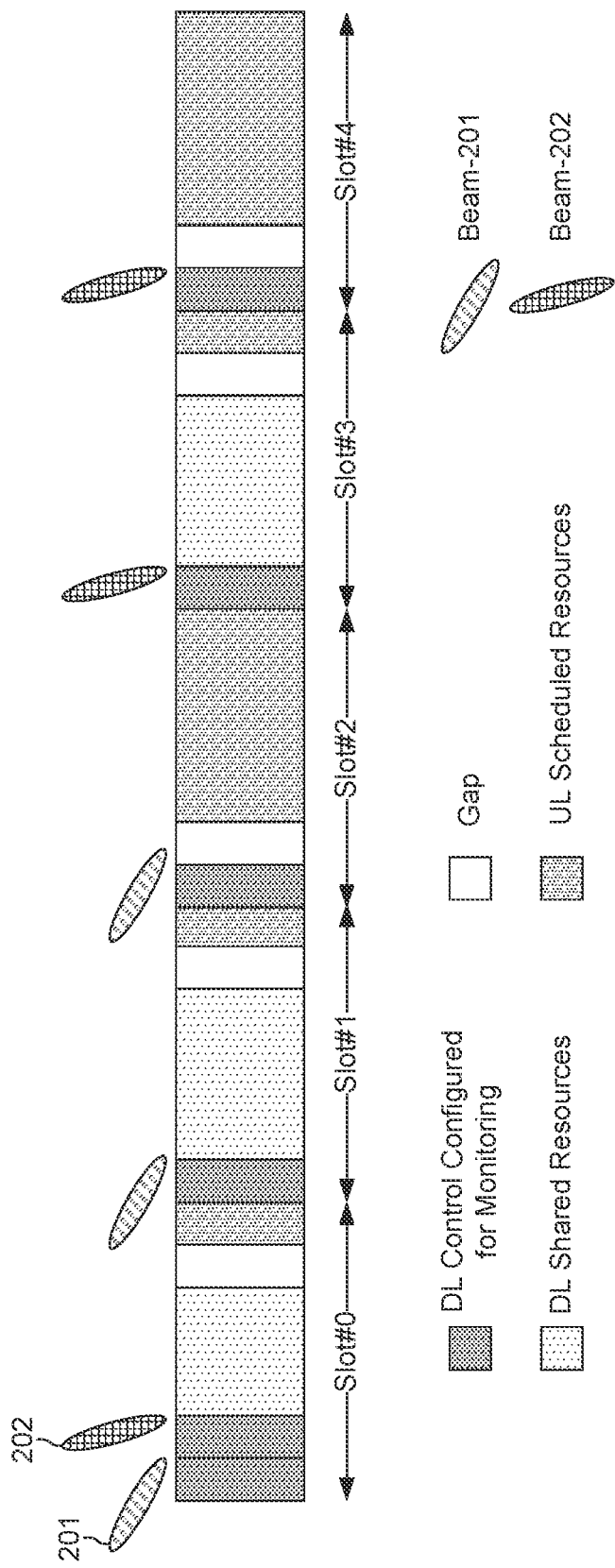
FIG. 1 illustrates an exemplary UE monitoring DCI on multiple beams.

FIG. 1 is an exemplary illustration of a UE (also referred herein as WTRU) monitoring DCI on multiple beams. Slot 1 and slot 2 are carrying a first beam (e.g., beam 201) and slot 3 and slot 4 are carrying a second beam (e.g., beam 202). First beam and second beam point in different spatial directions. There may be multiple beams and each slot may be different or there may be multiple beams and beams may occur in the same slot (e.g., slot #0), but on different symbols. DCI may be carried in a single beam in a slot (slot of a frame) or on multiple beams in a slot. The different symbols may carry different beams, but a given DCI may be confined to a single beam or multiple beams. When multiple beams are used, a beam occurs on one or more of the symbols carrying the DCI. Depending on the numerology, there may be a different number of slots in the frame. A frame may be 10 ms long. For 15 KHz numerology, there are 10 slots. The beam may be defined as a transmission in a certain spatial direction. The DCI in a slot may be transmitted on one beam (one spatial direction) or alternatively, the DCI in a slot may be transmitted on multiple beams (different spatial directions) where a certain number of symbols in the slot correspond to a given beam (spatial direction).

With continued reference to FIG. 1, a UE (e.g., WTRU 102c of FIG. 25A) may monitor multiple beams for receiving PDCCH, in which PDCCH includes DCI. The monitored beams may be from the same or different transmission reception points (TRPs), e.g., base station 114b of FIG. 25A. The UE may monitor the different beams as per a schedule, e.g., a configured monitoring occasion. The monitoring occasion defines the time resources when the UE may look for its control information (e.g., DCI in certain time resources). FIG. 1 shows an example where a UE monitors NR-PDCCH on 2 beams (e.g., beam 201 and beam 202 in slot #0) that are transmitted on specific symbols in different slots. The UE may receive DL or UL grants through both the beam pair links.

The number of monitored control symbols for each of the beams may be different—some beams carrying NR-PDCCH may be signaled more frequently than others, but the UE may be configured to know the occurrence of the beams and corresponding time and frequency resources. As disclosed herein, the monitoring occasion, e.g., the beam occurrence pattern and timing of the resources, may be configured through one or more of RRC, MAC CE, and DCI updates. This may be done in one of the following example ways. Resources correspond to the time resources. DCI may be monitored in certain spatial direction on certain time resources (such as 1st 2 symbols of every other slot, etc.). So we are monitoring DCI in a certain direction at a certain time. The spatial direction of the beam may be indicated through a QCL relation to the direction of a known reference signal, such as the SSB. So the UE may monitor the DCI in the same direction that it may monitor the related reference signal.

Figure 2:
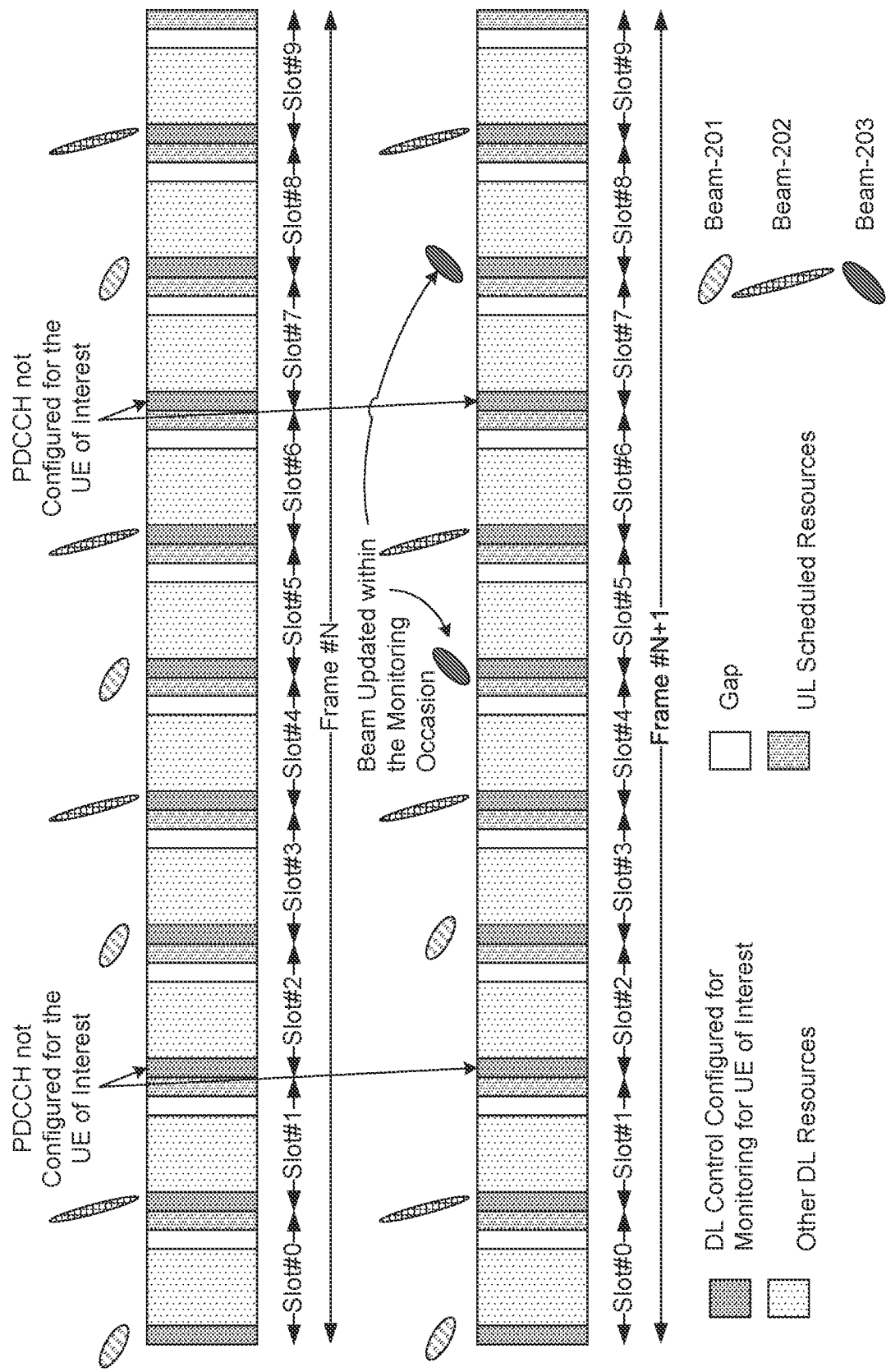
FIG. 2 illustrates an exemplary BPL for a UE is updated within the monitored resources.

In a first exemplary way, the time resources may be signaled through RRC. The monitored beam may be signaled through DCI or MAC CE as the beam may be updated frequently due to mobility, blockage, etc. FIG. 2 shows an example where a UE is configured for the following PDCCH monitoring occasion: leading symbols of slots #0, 1, 4, 5, 6, 7, 8, 9 of a frame. In Frame #N, the symbols carry beam 201 and beam 202 as shown in FIG. 2. When beam 201 is dropped and beam 203 is configured for the UE, the PDCCH signaling times for the UE remains the same, but the beam changes to beam 203 in slot #5 and slot #8 of the subsequent frame (Frame #N+1). If semi persistent scheduling is used to schedule resources to a UE and resources are already assigned to the UE for a given frame, when a change in the BPL occurs, the DCI may indicate the updates to the beam. For example, in FIG. 2, the DCI in slot #4 indicates the change to the beam 203 in slot #5 and slot #8 and future frames.

Figure 3:
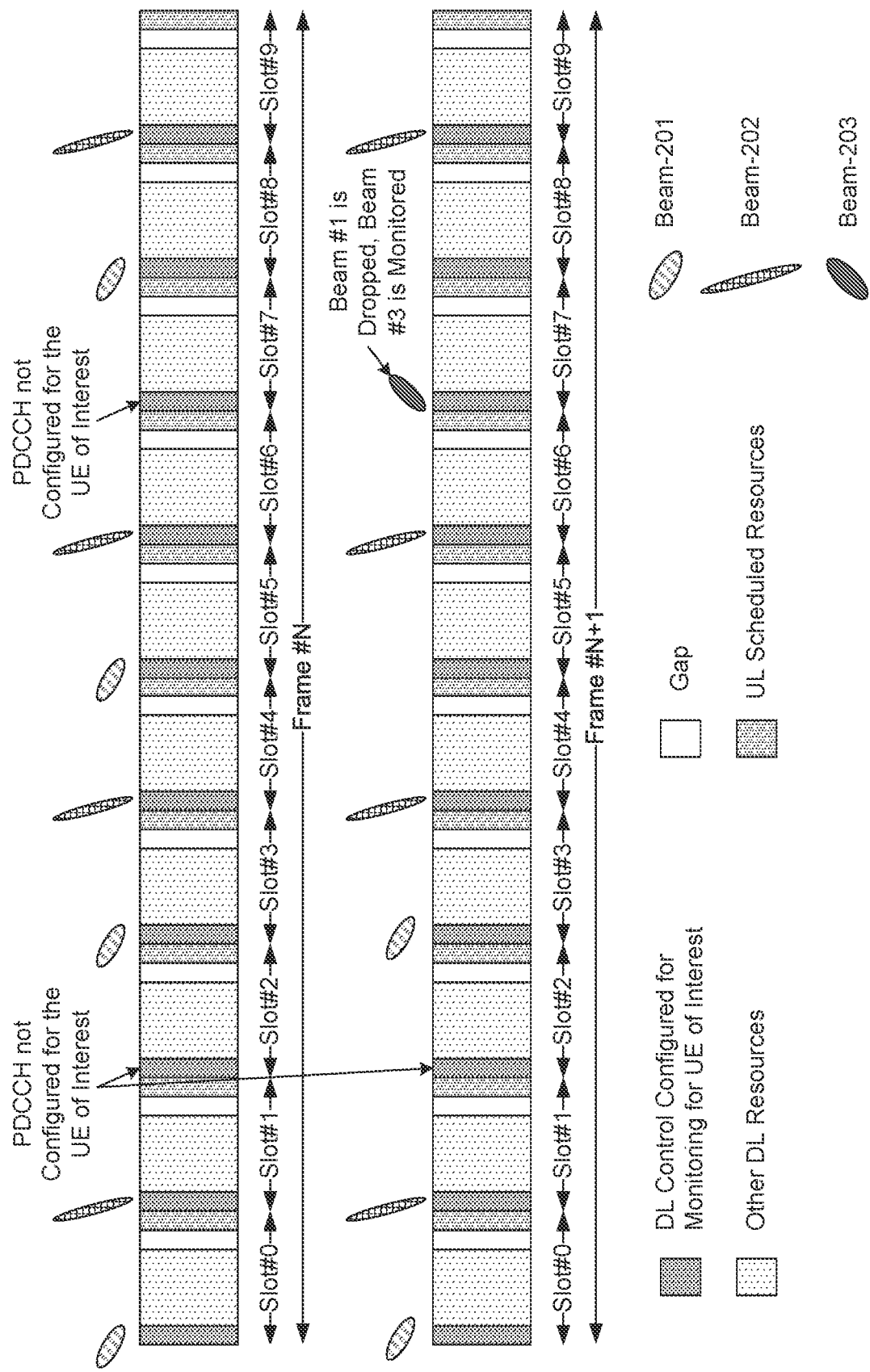
FIG. 3 illustrates an exemplary Update in BPL results in change in monitored resource.

In a second exemplary way, the beams for monitoring are configured through RRC and time resources are updated through MAC CE or DCI. Here the timing of PDCCH may be updated for a UE if a beam is updated. As seen in FIG. 3, in frame #N+1, the UE begins to monitor beam-203 in slot #7 and drops beam-201 from slot #5 and beyond. If semi persistent scheduling is used, the DCI in slot #4 may indicate the transition to beam 203. Although slot #4 is discussed other earlier slots are possible as well. If a beam is blocked (e.g., dropped), then there may be a desire to have some dynamic indication. If there is concern that during the time period that there is a blockage then you may want to update the timing resource more dynamically.

In a third exemplary way, both time resources and beams may be indicated through RRC and MAC CE for scenarios, such as mobility, where more latency can be tolerated.

Figure 4A:
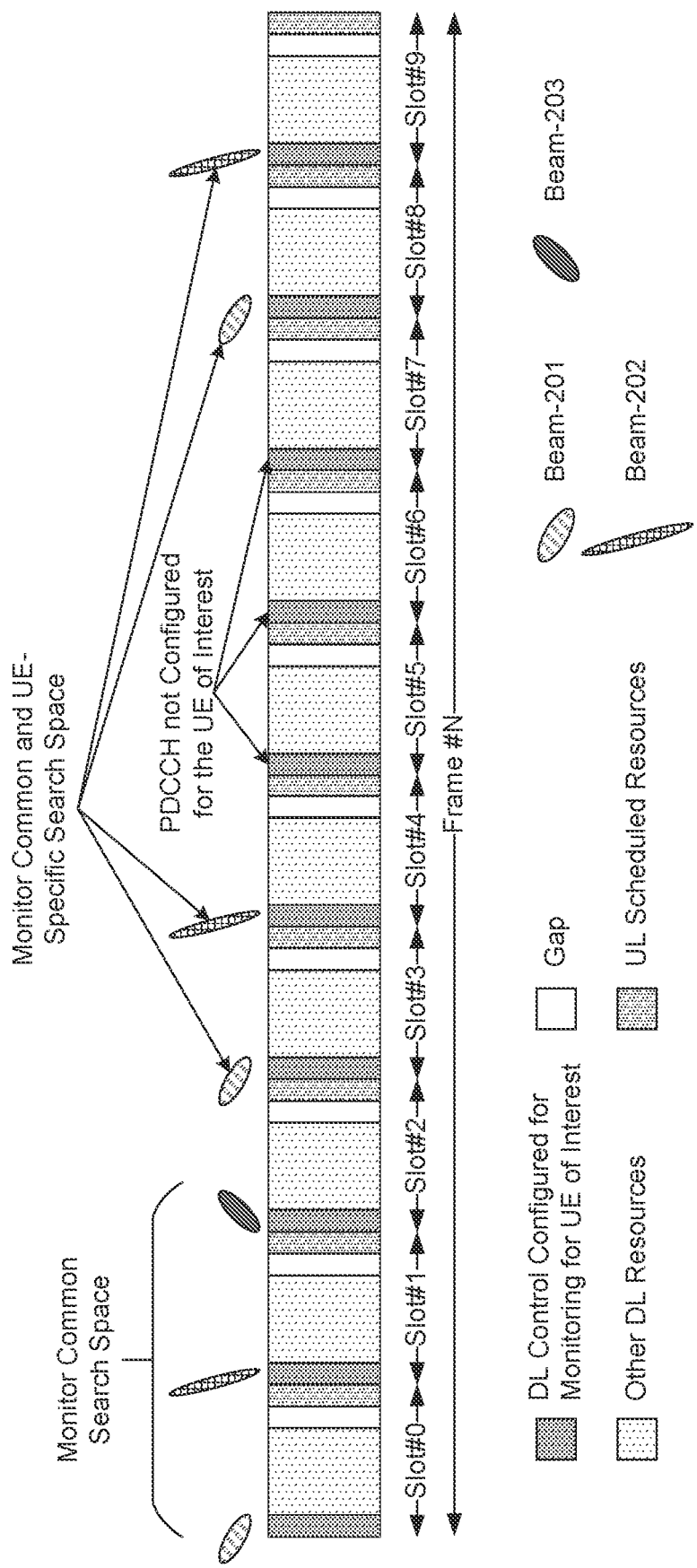
FIG. 4A illustrates an exemplary Different monitoring occasions for common search space DCI and UE specific search space DCI.

As disclosed herein, the monitoring occasions may be different for different types of CORESETs. For example UE specific search space DCI and common search space DCI may have different monitoring occasions configured, e.g. the time location and beams may be different. For example, DCI carrying paging may be configured on more beams and more frequently whereas UE-specific search space DCI may be transmitted on fewer beams as illustrated in FIG. 4A. The frequency or time or beam direction may be different for different types of DCI. For example, preemption indication which is a group common PDCCH may be transmitted as a lower periodicity than UE-specific DCIs. DCI for paging is in one type of common search space. CORESETs may be configured flexibly to include common or UE-specific search spaces. Certain CORESETs may include only common control search space as seen in FIG. 4 as paging DCI may require more frequent resources. The UE may decode the CORESETs on each occasion corresponding to whether it is configured to detect UE-specific search space DCI or common search space DCI. In this example, slots #0, #1, and #2 may be exclusively configured to signal common search space DCI to the UE of interest although they may carry UE-specific search space DCI to other UEs. The other symbols configured within the frame may carry both common search space DCI and UE-specific search space DCI to the UE of interest. It should be understood that the disclosed method allows for a number of locations that is required to be monitored by the UE to be configurable. In addition, each of the CORESETs may be configurable, such as location of the CORESETs, occurrence pattern in time of the CORESETs, and even frequency of the CORESETs (e.g., not occupying the entire carrier bandwidth). Furthermore, a UE may receive control regions (e.g., CORESET) on multiple beams and have a different occurrence pattern in time from one beam to the next.

Figure 4B:
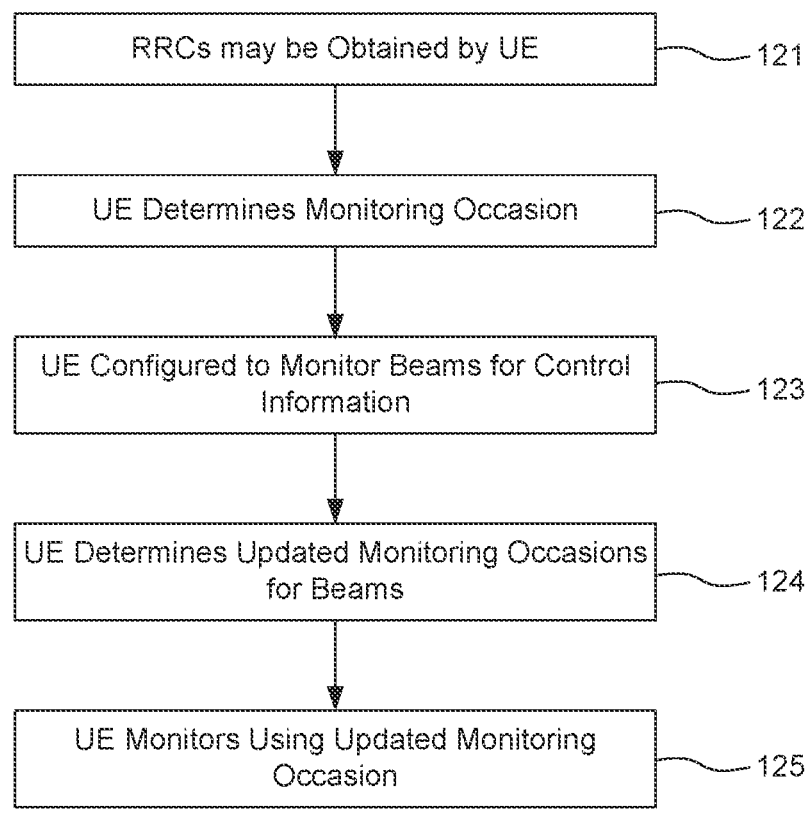
FIG. 4B illustrates an exemplary method for detecting control information.

FIG. 4B illustrates an exemplary method for detecting control information. At step 121, one or more RRCs may be obtained by a UE. The RRCs are an example of higher layer (e.g., not physical layer) signaling that may be used to provide configuration information. The RRCs may be from one or more TRPs. At step 122, based on the one or more received RRCs of step 121, the UE may determine one or more monitoring occasions for CORESETs for one or more beams. A beam, as disclosed herein, may be considered as a signaling from certain port/ports of a TRP in certain spatial directions, and may have similar spatial direction to that of a known reference signal, e.g., the beam may have spatial QCL with respect to a reference signal so that the receiver which receives the reference signal with a certain antenna configuration may also receive a beam that has spatial QCL with the reference signal using the same receiver antenna configuration. At step 123, based on the monitoring occasions of step 122, the UE may be configured to monitor for the one or beams for control information. The CORESETs have an occurrence pattern in time that may indicated by the RRC. Information is transmitted on beams. A UE may be able to receive multiple beams. DCI is sent on multiple beams for redundancy, i.e., if one beam is blocked another can reach the UE. Also spatial multiplexing increases the throughput, so multiple beams are used to signal DCI. Once the control information is received, the UE proceeds to act as per the control information—if it is a grant, UE receives PDSCH or transmit PUSCH. If it is a group-common PDCCH such as SFI, it adjusts its slot format, if it is a power control command, UE adjusts its power, etc.

At step 124, at some subsequent time the UE may receive one or more updated RRCs. At step 124, based on the one or more updated RRCs, the UE may determine one or more updated monitoring occasions for CORESETS for one or more beams. At step 125, the UE monitors using the updated monitoring occasion(s). It is contemplated that the updated RRCs may lead to configuring different monitoring occasions than what was provided at step 122. It should be also understood that the monitoring occasions may be different for different types of CORESETs (e.g., different types may mean UE-specific search space, common search space, types of DCI's, etc.). There may be multiple types of search spaces within a CORESET. DCIs of different types may be carried in different search spaces. Different search spaces may carry DCIs with different RNTIs, example, preemption DCIs may be carried in a certain search space whereas RACH related DCIs may be carried in a different search space. Different monitoring occasions may be configured for such search spaces even if they are all common search spaces Further, UE has different RNTI's in different CORESETs and those CORESETs may be configured to have different monitoring occasions; they don't all have to occur at the same time. This exemplary method for detecting control information may allow for flexibility in configurations so that UE may handle different types of DCI's differently. Unlike LTE where the CORESET resources are fixed, this provides flexibility to allocate CORESET resources on the beams best suited to the UE, allocate CORESET resources with appropriate periodicity depending on the type of DCI (some DCI may require to be monitored more frequently than others, example, preemption DCI may be monitored less frequently than a DCI providing UE specific grant). The UE may be configured to monitor a CORESET that has spatial QCL with an SSB.

Figure 5:
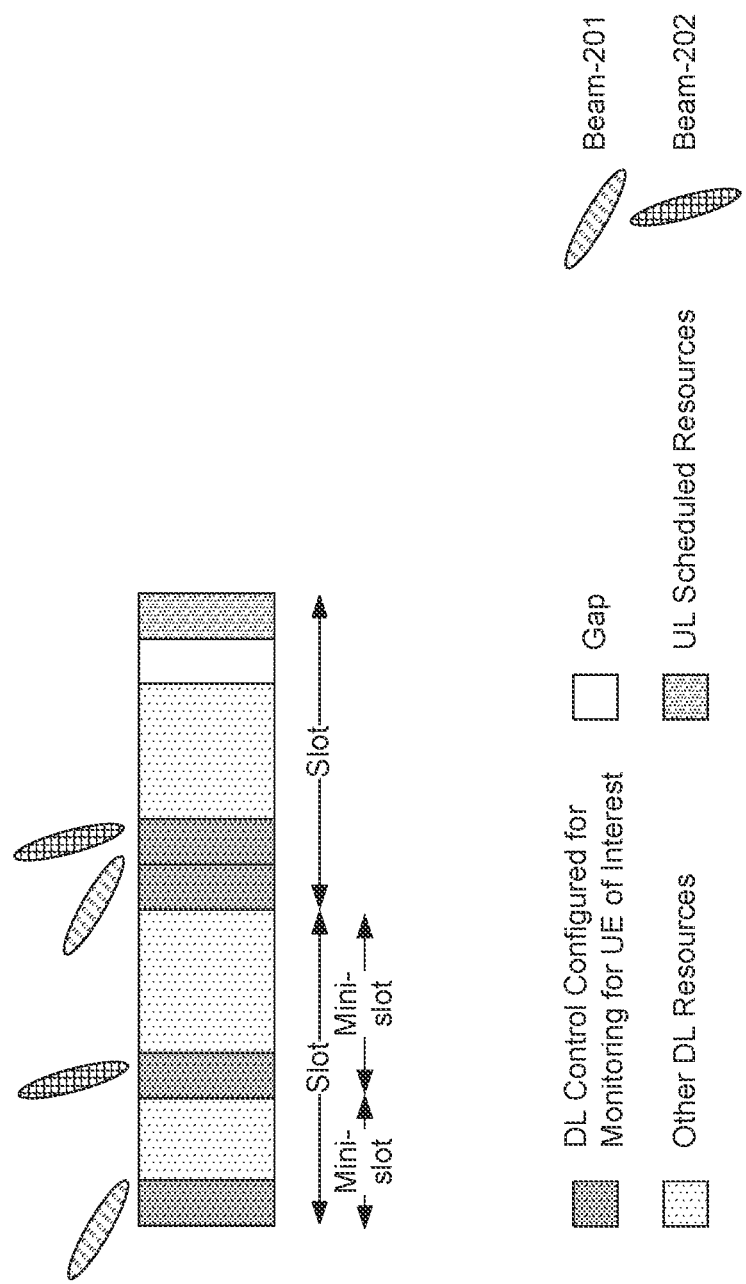
FIG. 5 illustrates an exemplary Monitoring occasion within mini-slots.

FIG. 5 illustrates an exemplary monitoring occasion within mini-slots. CORESET resources may be configured within a mini-slot, so a single slot may contain multiple CORESETs for a UE to monitor. In general, the PDCCH transmission and monitoring occasions may occur in mini-slots (e.g., smaller than a slot and have anywhere between 2-7 symbols) as well.

Figure 6:
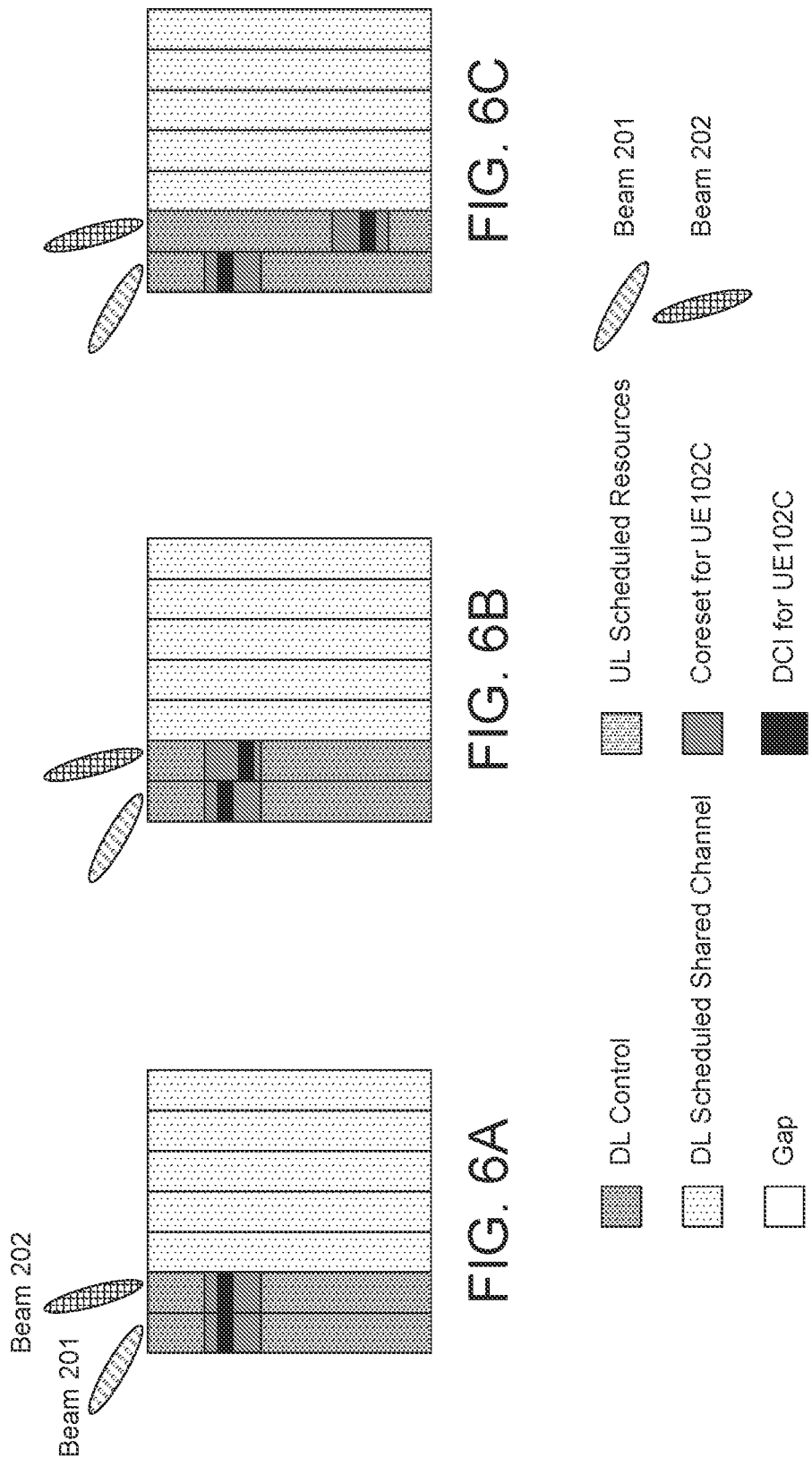
FIG. 6A illustrates exemplary CORESET configurations for multi-beam control signaling with control symbol sweeping—Same CORESETs and DCI locations.
FIG. 6B illustrates exemplary CORESET configurations for multi-beam control signaling with control symbol sweeping—Same CORESETS but different DCI locations.
FIG. 6C illustrates exemplary CORESET configurations for multi-beam control signaling with control symbol sweeping—Different CORESETs and DCI locations.
Figure 7:
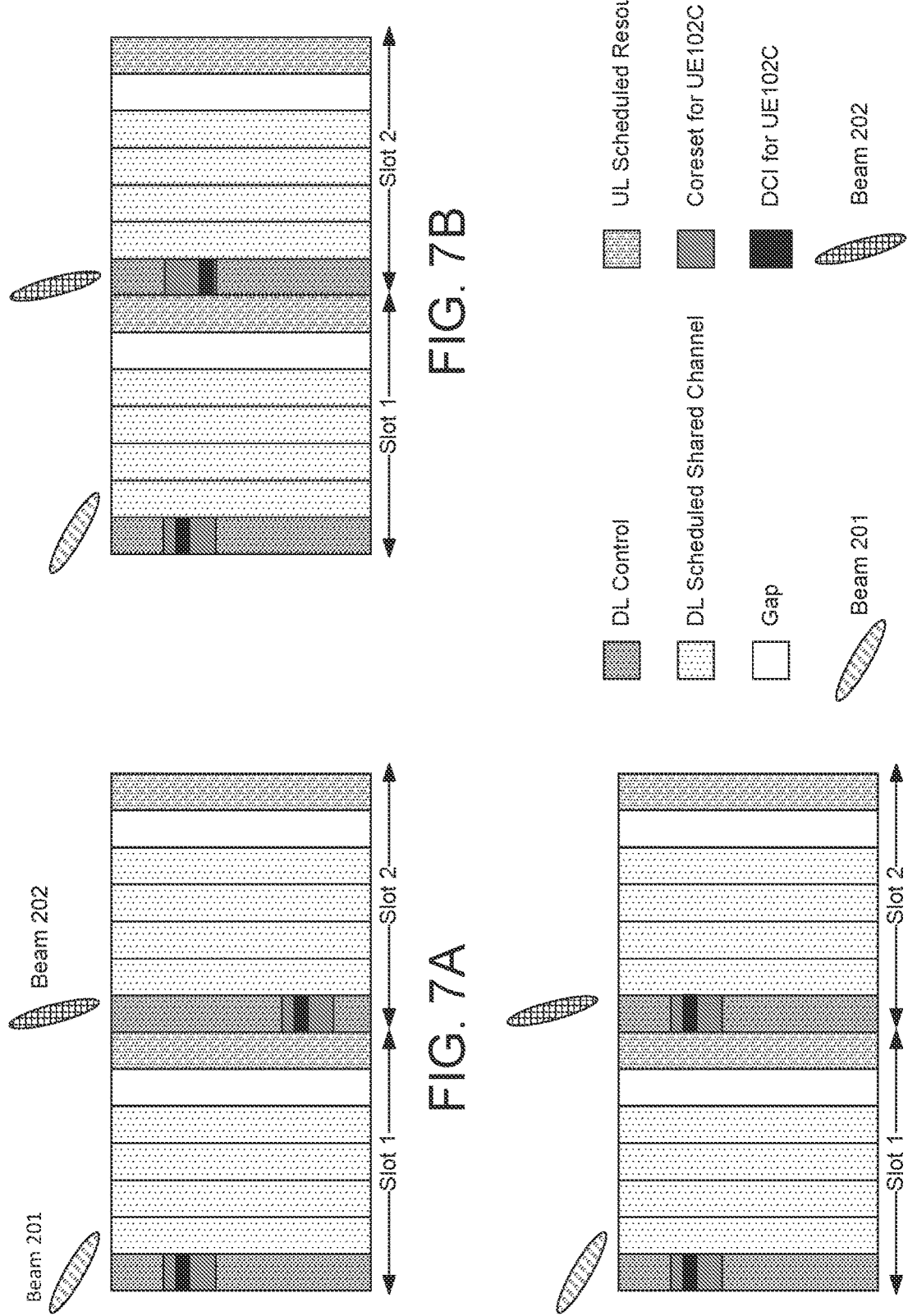
FIG. 7A illustrates exemplary E CORESET configurations for multi-beam control signaling across slots—Same CORESETs and DCI locations.
FIG. 7B illustrates exemplary E CORESET configurations for multi-beam control signaling across slots—Same CORESETS but different DCI locations.
FIG. 7C illustrates exemplary E CORESET configurations for multi-beam control signaling across slots—Different CORESETs and DCI locations.

CORESETs for multi beam PDCCH transmission are disclosed below. CORESETs may be configured in the following ways as shown for the following exemplary cases. FIG. 6 shows examples in which the PDCCH is swept at once before PDSCH and other signals are transmitted. The PDCCH may be repeated and the PDSCH may be transmitted following the sweep through of the PDCCH. FIG. 7 shows examples in which beams sweep though slots of PDCCH and PDSCH/PUSCH/PUCCH. In FIG. 6, a CORESET may include multiple symbols signaled on different beams. The CORESET may be followed by PDSCH/PUSCH/PUCCH. In FIG. 7, the CORESET may be signaled using only one beam. Each beam may be transmitted on a different CORESET.

As shown in FIG. 6A and FIG. 7A, the CORESETs may be the same for the monitored beams and the DCI may occur in the same location. The frequency locations for the DCI are the same, but the time is different for beam 201 and beam 202.

As shown in FIG. 6B and FIG. 7B, the CORESETs may be the same for the monitored beams, but the DCI may occur in different locations within the CORESET. Note that when the CORESETs are the same, the CORESET configuration overhead is smaller.

As shown in FIG. 6C and FIG. 7C, the CORESETs are on different resources for the beams. This is especially applicable when the UE may operate on different frequency regions for different beams. The UE may be configured with the CORESET resources and periodicity and spatial QCL information to monitor the DCI. The configuration procedures is similar to the cases discussed earlier (e.g., FIG. 4B). UE monitors the received signal accordingly for its DCI. Upon receiving a valid DCI after blindly decoding in the monitored resources, UE acts as per the control information.

The different ways of configuring the CORESET have the following technical effect. In FIG. 6, it is possible to sweep the DCI with less latency compared to FIG. 7 as the UE's monitoring occasions occur one after the other in the CORESET. In FIG. 7, configuration of the CORESET is simpler compared to FIG. 6 and may require less overhead. With reference to FIG. 6B, 7B, the CORESET is the same across the beams. This may be especially useful when the CORESET tends to be wideband and occupies much of the reception bandwidth of the UE. With reference to FIG. 6C and FIG. 7C, the CORESET (especially frequency region) may be different on different beams to accommodate the channel characteristics for the UE.

Figure 8:
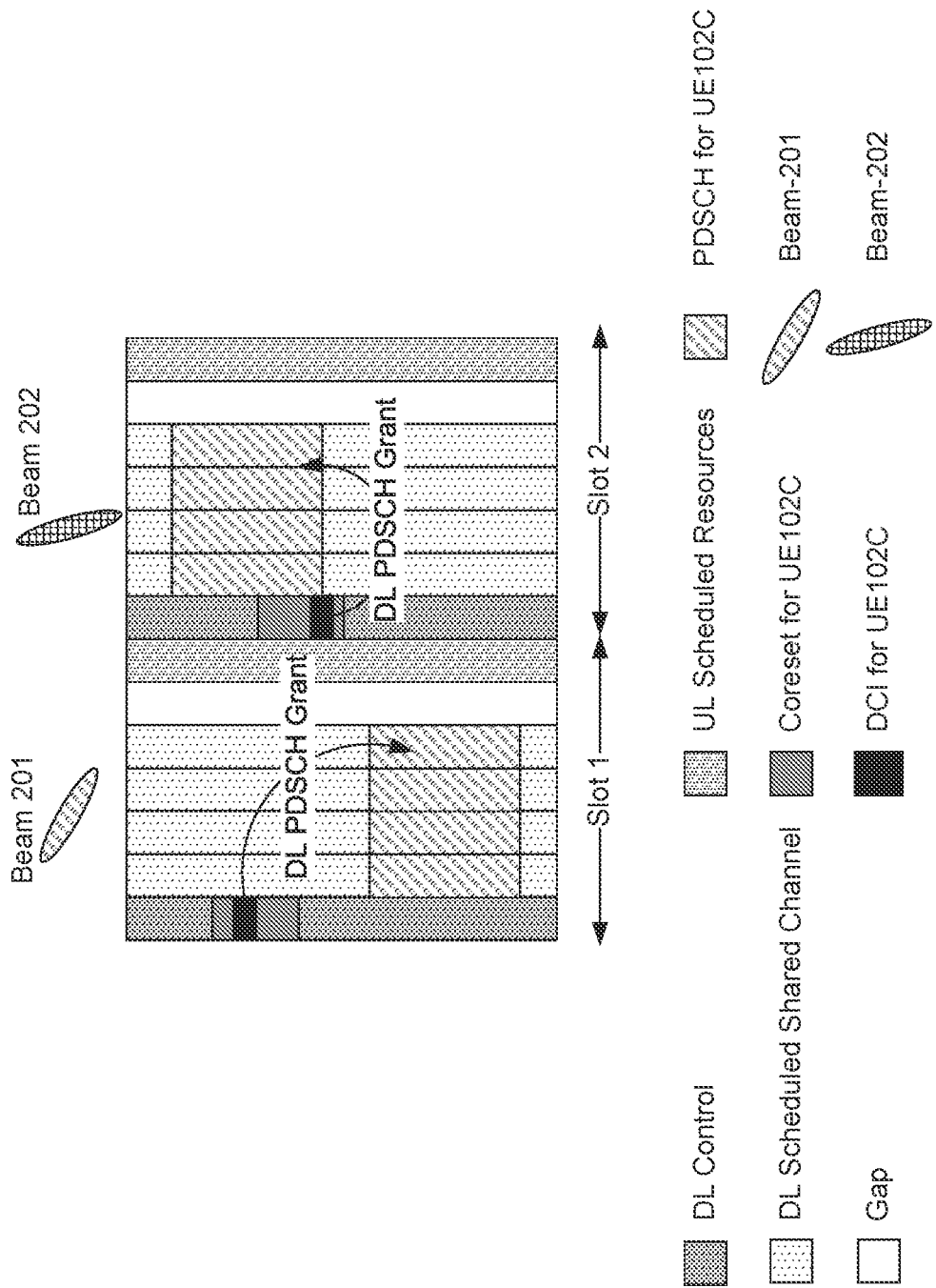
FIG. 8 illustrates an exemplary DCI on different beams making DL grants.

FIG. 8 illustrates an exemplary DCI on different beams making DL grants. The DCI on different beams may be different, for example, they may make different PDSCH grants. As shown in FIG. 8, the UE monitors Beam 201 and Beam 202 and receives different DL grants on the corresponding DCIs. Here the DL assignments may be for different hybrid automatic repeat request (HARQ) processes or for different redundancy versions (RVs) of a HARQ process or the same RV of a HARQ process (e.g., for robustness or reliability). Reliability may imply lower BLER, robustness may be considered with regard to having a link (e.g., not getting blocked).

Figure 9:
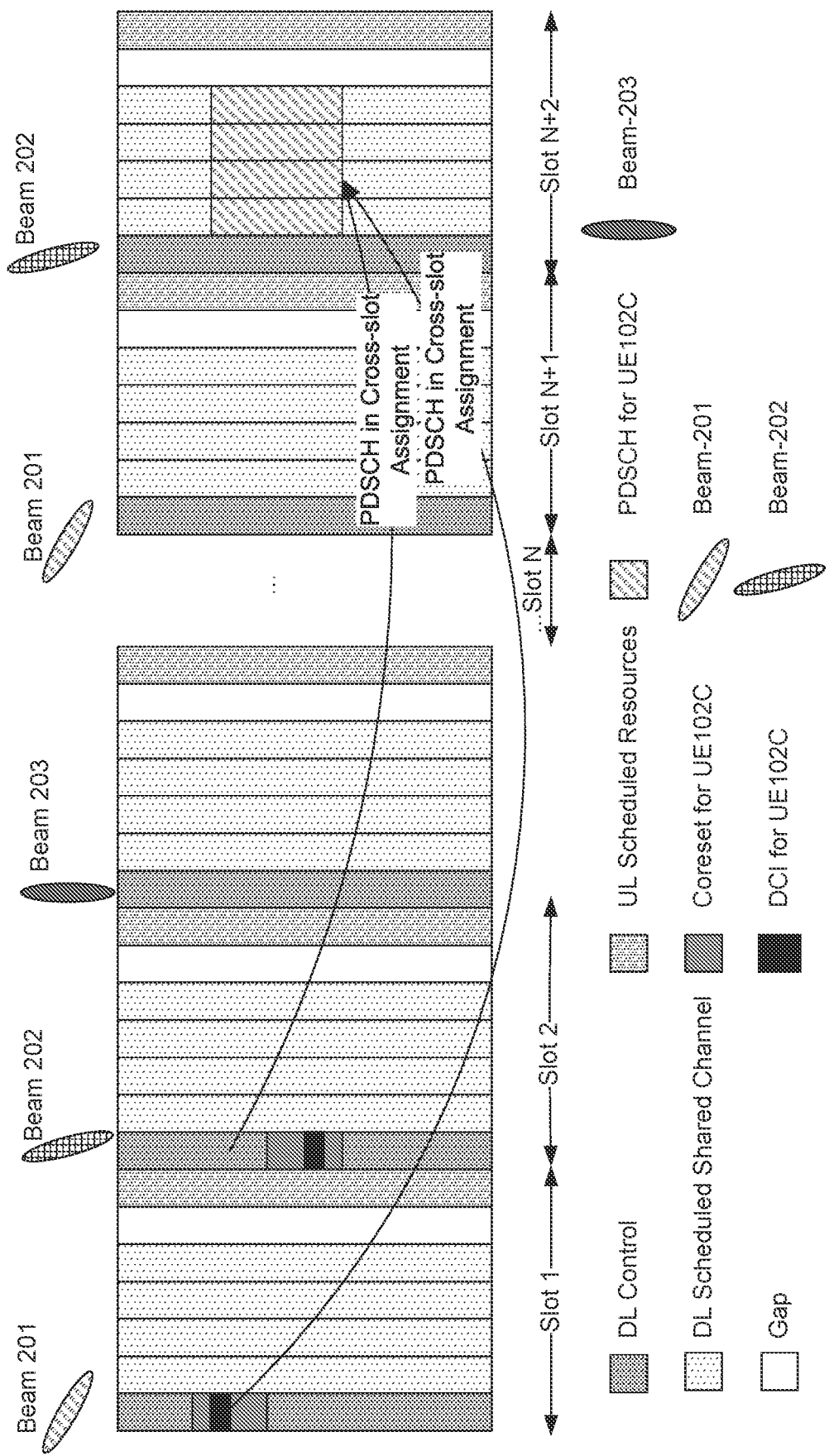
FIG. 9 illustrates an exemplary DCI repetition which may be robust against blockage; multiple DCI points to same grant.

FIG. 9 illustrates an exemplary DCI repetition that may be robust against blockage; multiple DCIs point to same grant. The DCI may be repeated on different beams for increased robustness against blockage and for greater reliability. So, if a UE fails to decode the DCI on one beam correctly, it still successfully decodes the DCI on another beam. For example, the DCI is repeated on beam 201 and beam-202 and both indicate a cross-slot DL grant as shown in FIG. 9. Here the UE is configured to monitor the PDCCH on beam 201 and beam 202. Beam 201 and Beam 202 are making the same grant. Again, with reference to FIG. 9, it should be understood that the DCI is repeated (especially on different beams) so that the UE has a high chance of receiving at least one the DCIs. When the repeated DCIs provide a grant, the DCIs may all indicate the same set of resources for the grant. A possible benefit is that it may ensure that the UE receives at least one DCI.

Figure 10:
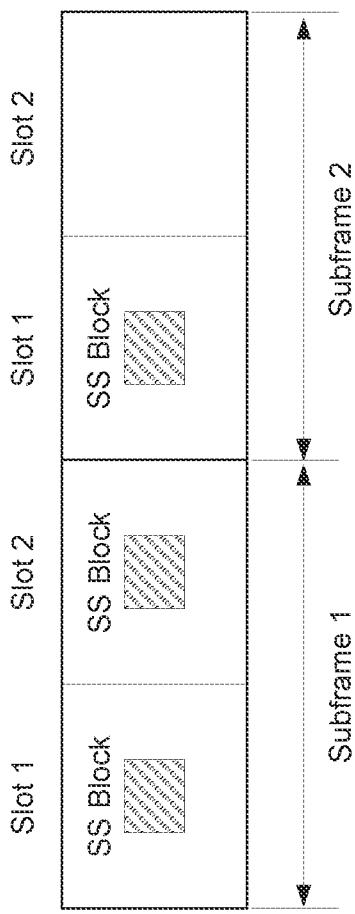
FIG. 10 illustrates an exemplary Subframe structure with there is a SS block.

FIG. 10 illustrates an exemplary Subframe structure with there is a SS block. Here, the detail structure of the slots may include an SS block. In one subframe, both of the two slots can include the SS block or only one includes the SS block as shown in FIG. 10. In this example, slot 2 in subframe 2 doesn't contain SS block and it can be PDSCH, PUSCH, etc. Each SS block may include a transmission that a UE should look for to do its initial synchronization. The typical use for the SS block is each SS block is one beam. So if the UE sweeps through these different SS blocks and determines that it is able to hear on one or two or other subset of SS block, then the UE knows with a certain receiver configuration it can hear in certain directions spatially.

In NR, the length of the slot can be 7 symbols or 14 symbols. The front loaded PDCCH can be 1-3 symbol(s). An SS block occupies 4 symbols which includes one symbol PSS, one symbol SSS and two symbols PBCH. The location of a SS block in a slot may be: 1) Fixed location: in the $4^{th}$-$7^{th}$ symbols; or 2) Following the front loaded PDCCH symbol(s).

For the 7 symbols slot case, the slot structure is shown in FIG. 11A-FIG. 11F. In FIG. 11A, FIG. 11B, and FIG. 11C, the SS block is located in the $4^{th}$-$7^{th}$ symbols for the 1-3 symbol(s) front loaded PDCCH cases. In FIG. 11A, FIG. 11D, FIG. 11E, and FIG. 11F, the SS block is located at the symbols next to the front loaded PDCCH. Same location principle applies to the 14 symbols slot case.

The usage of the symbols next to the SS block depends on the number of the symbols that remain (N). If, N<2 for example, the remaining symbol may only be used for the DL, an example is shown as FIG. 11D.

If N=2, the symbols may be used for both DL only and UL only. FIG. 11D shows an example for DL only use case. FIG. 11F shows an example for UL only use case.

Figures 12A, 12B, 12C:
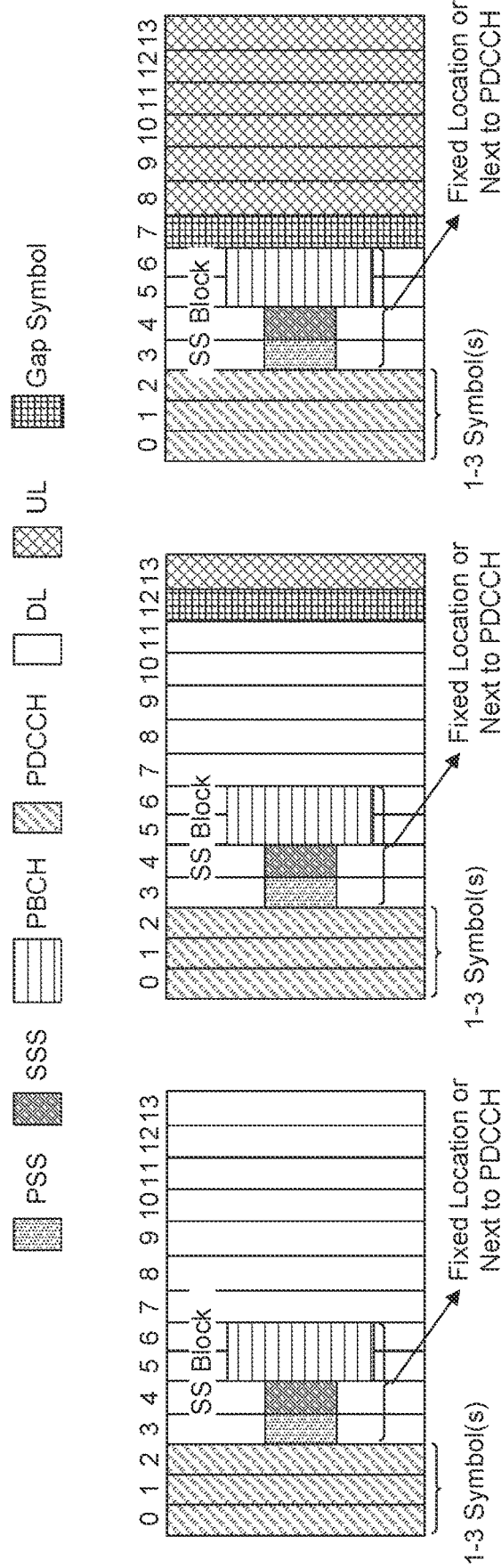
FIG. 12A illustrates exemplary Slot structure with different DL/UL symbol allocation.
FIG. 12B illustrates exemplary Slot structure with different DL/UL symbol allocation.
FIG. 12C illustrates exemplary Slot structure with different DL/UL symbol allocation.

If N>2, the symbols can be used for DL only, UL only, and DL+UL. (N>2 situation happens in 14 symbols slot case). FIG. 12A shows an example for DL only use case. FIG. 12B shows an example for DL+UL use case. FIG. 12C shows an example for UL only use case.

In NR, the PDCCH and SS block within a slot may be transmitted on the same beams or on different beams. Even for every symbol of the PDCCH, different symbols may be transmitted on different beams. Therefore, no QCL assumption may be made between the PDCCH and SS block. Within one slot carrying the SS block and the PDCCH the relationship may be unknown for the spatial direction. However, in similar scenarios, the QCL relationship between the PDCCH and SS block can be utilized to reduce the overhead and computational complexity. FIG. 13A-13C illustrate exemplary QCL assumptions between SS block and PDCCH. In FIG. 13, the QCL relationship may exist between the PDCCH and SS block within a block, which applies to 7 symbols slot case and 14 symbols slot case.

Using 7 symbols slot case as an example, in FIG. 13A, the PDCCH and SS block are transmitted on the same beam. In this case, both the spatial QCL parameters and QCL of the large-scale parameters w.r.t. {delay spread, Doppler spread, Doppler shift, average gain, or average delay} may hold between the SS block and PDCCH. In FIG. 13B, the SS block is transmitted on one beam and the PDCCH, which may be 1-3 symbols, is transmitted on another beam. These two beams, for this example, are transmitted to the same direction and may be QCL-ed w.r.t spatial QCL parameters. Symbols 1-3 (#0-#2 is PDCCH) may be on a narrower beam than symbols 4-7 (#3-#6). As shown, there may be QCL-ed based on spatial parameters and non-spatial (e.g., large-scale) parameters. In FIG. 13C, two or three symbols may be used to transmit the PDCCH. These two or three symbols, in this example, are transmitted on different beams (slightly different angles) that point to the same direction and are different from the beam used for SS block. In this case, the beams used for PDCCH may be QCL-ed with each other w.r.t spatial QCL parameters and all the beams may be QCL-ed with the beam used for SS block w.r.t spatial QCL parameters. With the knowledge of these QCL relationships between the PDCCH and SS block, the UE may use the same beam used for SS block to receive the PDCCH or the UE may reuse the information collected from SS block to do the channel estimation for PDCCH, etc. Since there are so many different scenarios and no default QCL assumption can be made in NR, the QCL relationship between the PDCCH and SS block may be indicated to the UE through the RRC signaling or MAC-CE from a TRP. The indication may be explicit or implicit. Explicit may be considered that the QCL information is configured to the UE. For example, the UE specific CORESET is configured with certain QCL relations to reference signals. So the UE uses this information to receive the corresponding DCIs. Implicit may be considered that the QCL information is known a priori. For example, the RMSI CORESET is implicitly QCL with the SSB that is detected by the UE.

NR may use control signaling on DL and UL to facilitate UL grant free transmissions. Disclosed herein is a method for the identification of a grant free UL transmission and identification of the UE performing the grant free transmission. A reference signal (RS) sequence may be used to identify the presence of a grant free transmission. Henceforth this RS is referred to as grant free-reference signal (GF-RS). A GF-RS may be assigned to each grant free UE. In general, the sequences may be orthogonal or quasi orthogonal to minimize cross correlation between the UEs. A specific GF-RS with certain time-frequency resources and cyclic shift may correspond to certain time frequency resources for the GF payload. The GF-RS may be used for channel estimation wherever possible.

For DFT-s-OFDM based UL, GF-RS may be in the form of Zadoff-Chu (ZC) sequences. They may be assigned in a comb like fashion on the frequency resources in a symbol with a repetition factor N to keep the peak to average power ratio (PAPR) bounded. When N=1, the sequence used contiguous resource elements (REs).

Figure 14A:
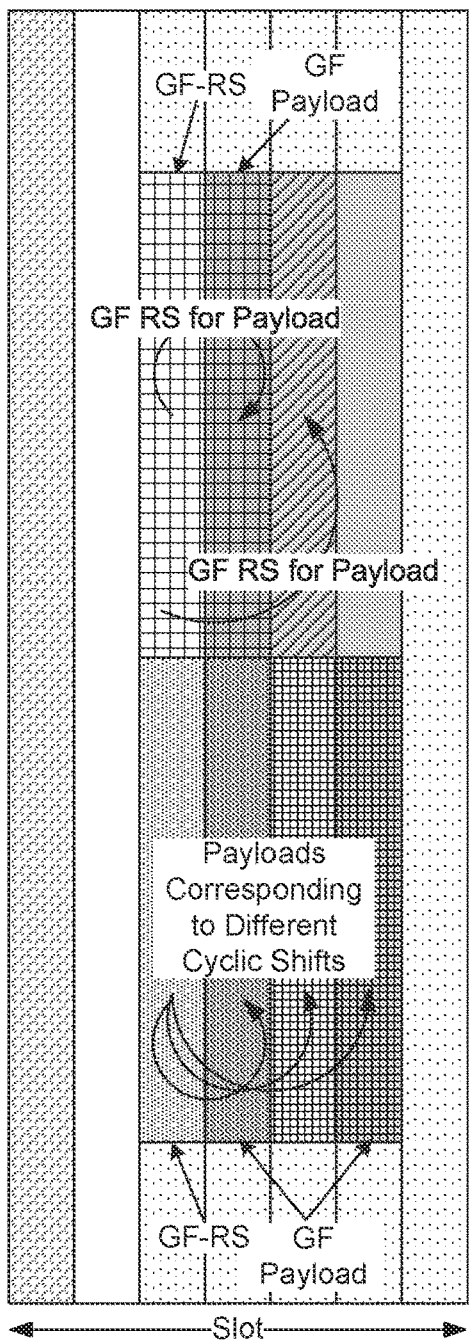
FIG. 14A illustrate exemplary GF-RS configuration for DFT-S-OFDM UL-Contiguous.
Figure 14B:
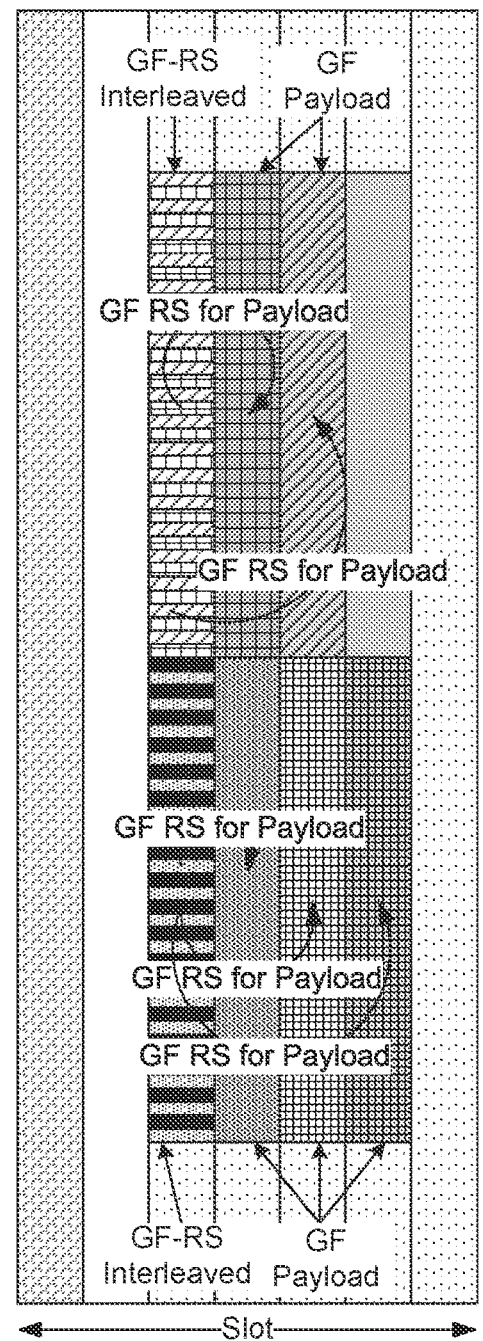
FIG. 14B illustrates exemplary GF-RS configuration for DFT-S-OFDM UL-Comb like GF-RS.

FIG. 14A-FIG. 14B illustrate exemplary GF-RS configuration for DFT-S-OFDM UL. In FIG. 14A, N=1 is used and GF-RS of a UE may occupy all allotted frequency resources in the symbol. Multiple GF-RS sequence with different cyclic shifts can be simultaneously signaled in those resources and each sequence corresponds to a preconfigured set of resources where the payload is carried. In FIG. 14B, N=2 is used and the GF-RS sequences are interleaved. When certain GF-RS are not transmitted the corresponding payload resources are empty.

Figure 15:
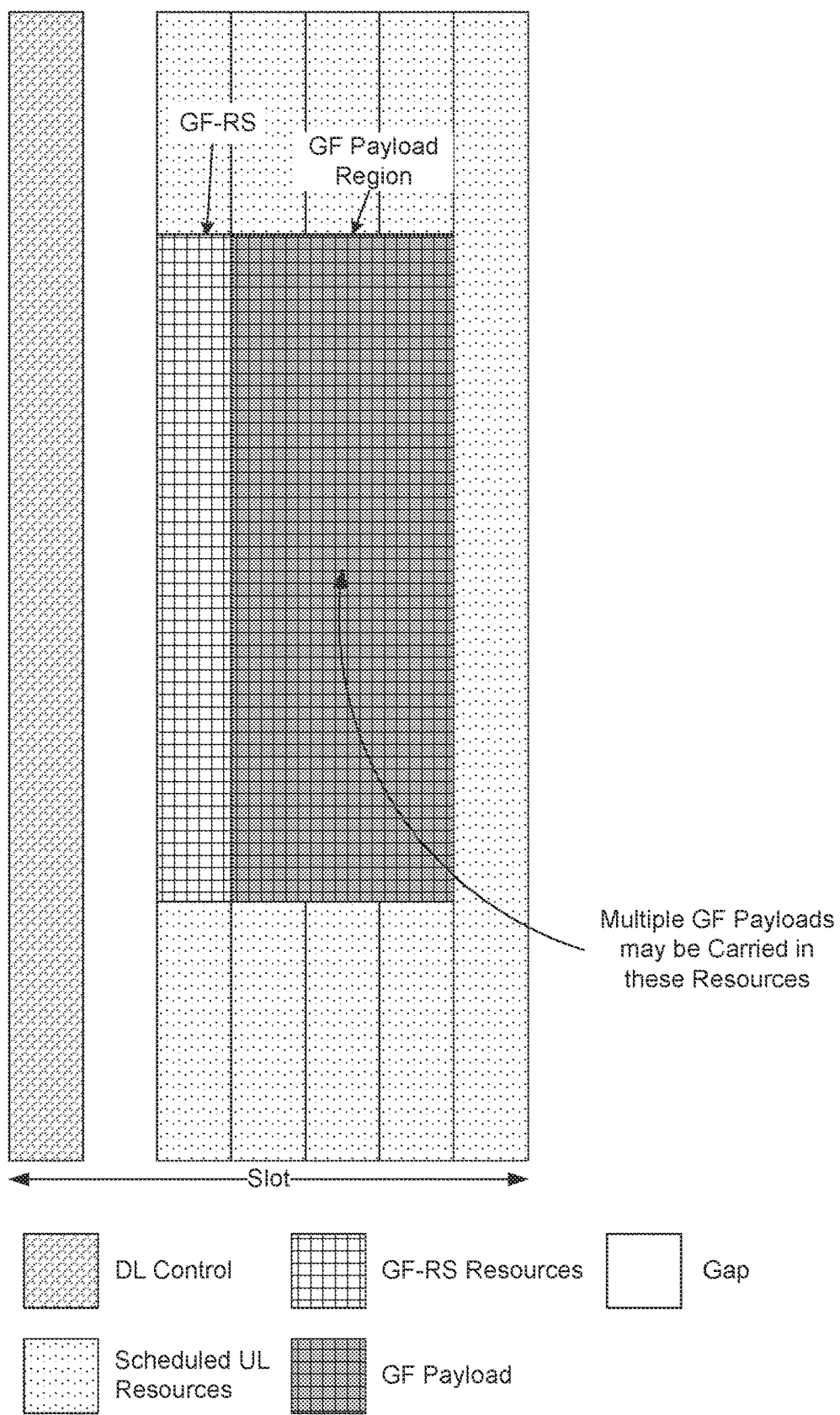
FIG. 15 illustrates an exemplary Payload region for GF operation may be shared between multiple users.

In general, the GF payloads may have reserved resources corresponding to each cyclic shift so that no collision occurs if the GF-RS overlap. Alternatively, FIG. 15 illustrates an exemplary Payload region for GF operation may be shared between multiple users, in which the GF payloads may collide with each other within a specific set of resources. In FIG. 15 the payload resources are shared by multiple GF UEs And orthogonal spreading codes or low rate codes may be used to orthogonalize the UEs.

Figure 16:
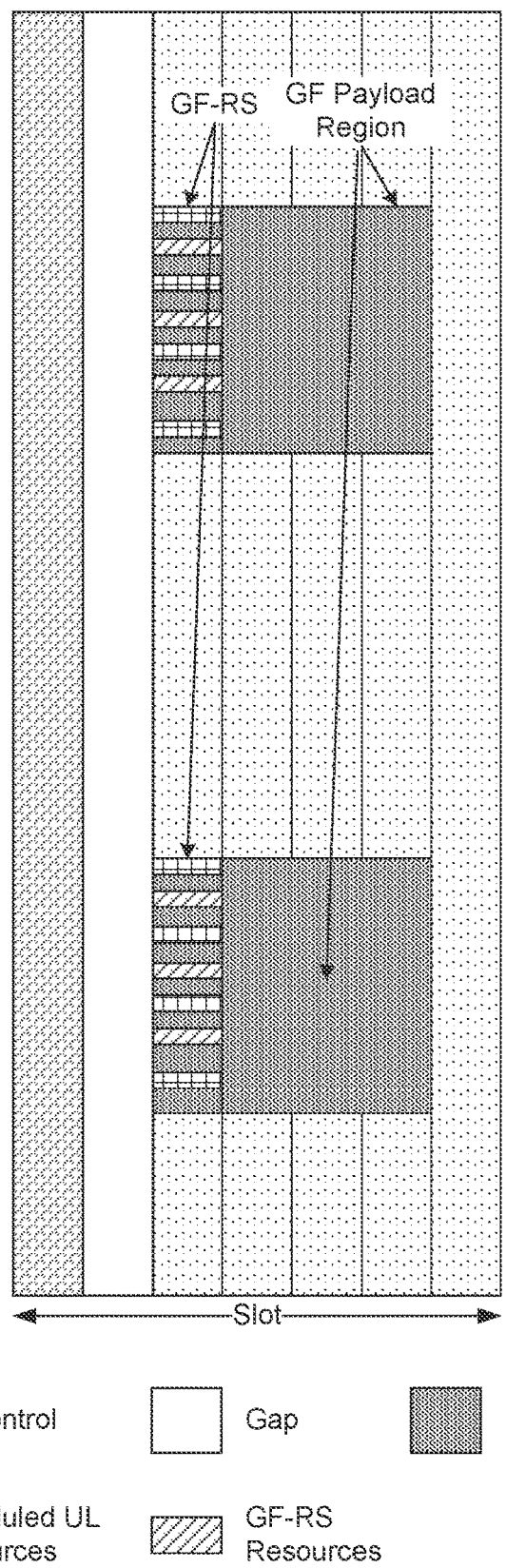
FIG. 16 illustrates an exemplary Cp-OFDM based GF-RS configuration supporting discontinuous frequency resource allocation.

For cyclic prefix-OFDM (CP-OFDM) based UL grant free operation, the GF-RS may be discontinuous in frequency to allow for frequency diversity of payload. The RS is front loaded to enable quick detection of the grant free transmission. An example is shown in FIG. 16. The payload region may be multiplexed with the GF-RS in frequency.

Figure 17:
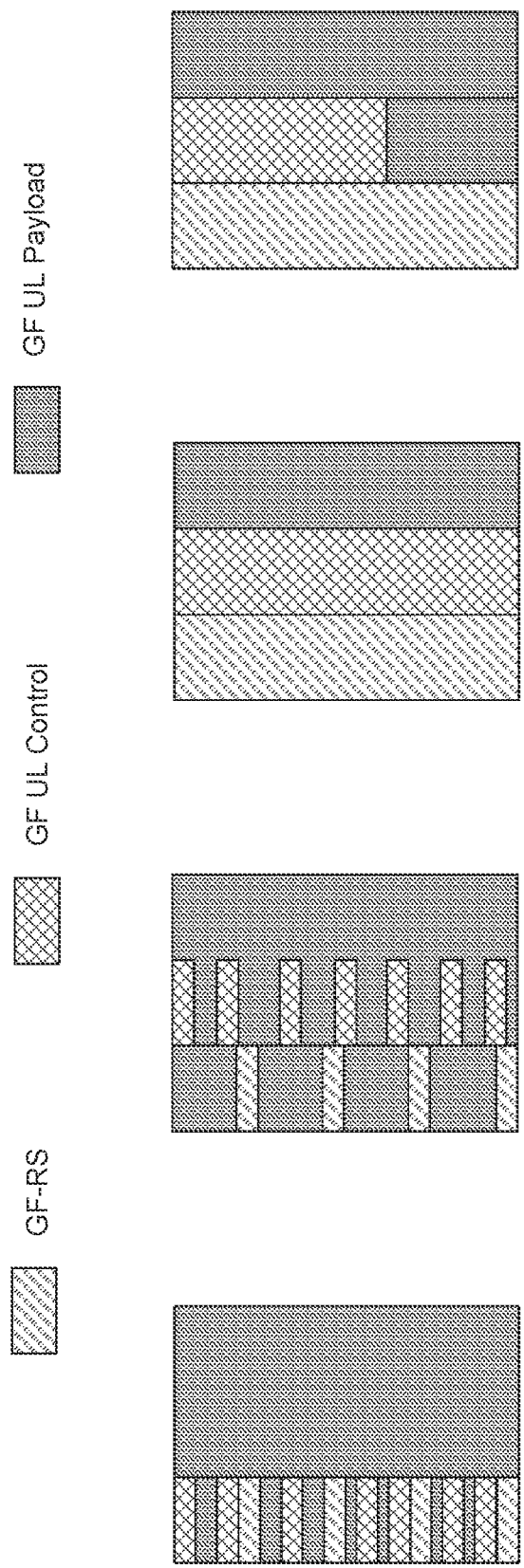
FIG. 17A illustrates exemplary GF control region configuration—multiplexed with GF-RS in CP-OFDM.
FIG. 17B illustrate exemplary GF control region configuration—configured in symbol following GF-RS in CP-OFDM.
FIG. 17C illustrate exemplary GF control region configuration—Follows GF-RS in DFT-S-OFDM, (D) Multiplexed with payload in DFT-s-OFDM.
FIG. 17D illustrate exemplary GF control region configuration—Multiplexed with payload in DFT-s-OFDM.

Because there may be situations in which the number of UEs may be very large compared to the number of available sequences or resources, multiple UEs may be assigned the same resources. So UE identification should be done after identification of the presence of the grant free transmission. The UE ID, such as the C-RNTI (16 bits), may be transmitted along with the payload. Alternatively, the network may assign a grant free RNTI (GF-RNTI) of fewer than 16 bits (e.g., 8 bits) to UEs and this GF-RNTI may be transmitted with the payload. FIG. 17A-17D illustrate exemplary GF control region configuration. FIG. 17A and FIG. 17B show examples of CP-OFDM with GF UL control resources of a UE in the leading symbols of the payload region. FIG. 17C and FIG. 17D show examples for DFTS-S-OFDM where the GF UL control resources are contiguous with a complete symbol or partial symbol resources multiplexed with payload.

Figure 18:
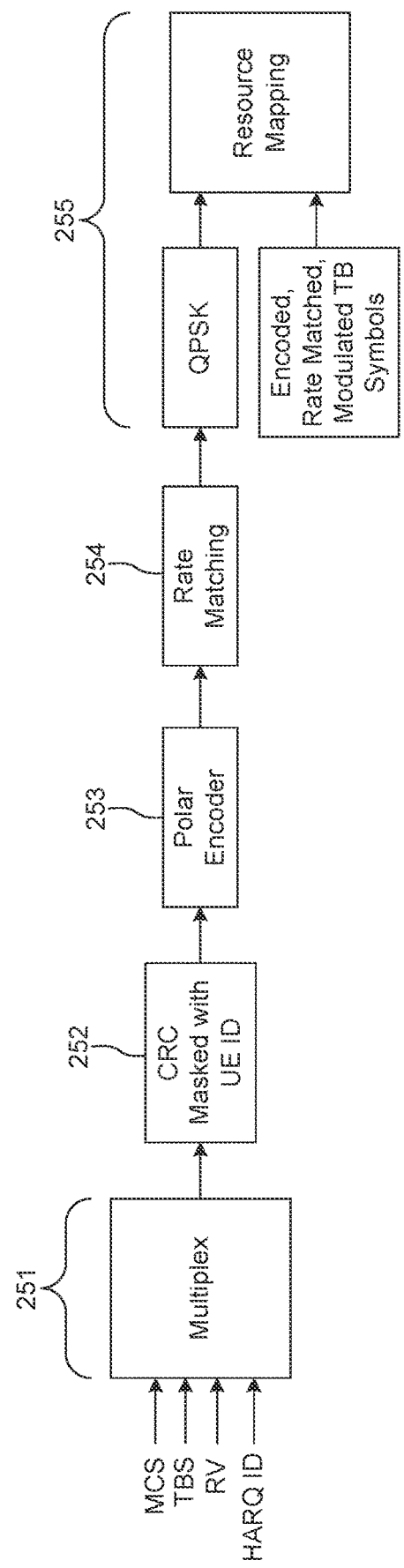
FIG. 18 illustrates an exemplary Transmission chain for UL GF control signal.

UL GF Control information such as payload size, MCS, HARQ process ID, RV, etc. may be encoded together. The UE ID may be applied as a mask to the CRC attached to the control information. Depending on the payload size, reed muller (RM) or polar coding may be applied to the control information. FIG. 18 shows examples of how the UE ID may be sent with the payload. Quadrature phase shift keying (QPSK) may be used for the control information. The rate matching may depend on the amount of GF resources available, MCS used for the data payload and target block error rate (BLER) for payload and UL control. Further, with regard to FIG. 18, it may be considered as showing the encoding of DL control information. The UE may transmit UL control information in a similar manner for GF transmission. At step, 251, the payload may include MCS, TBS (size of transport block), etc. At step 252, a CRC applied to the payload may be masked with the GF-RNTI. These bits of masked CRC may be attached to the payload. The bits may be encoded (step 253), rate matched (step 254), modulated and multiplexed with other signals (step 255), such as PUSCH and transmitted in the UL. The gNB may rely on successfully decoding GF-RNTI to detect the UL control information.

DL control signaling in grant free transmissions. Below is a list of possible contents of the DCI. Dynamic signaling through DCI may be used to configure one or more of the following parameters for grant free signaling: 1) Enabling or disabling grant free transmission in one or more slots; 2) Configuring UL time and frequency resources that may be used for grant free signaling in one or more slots; 3) Indicating a single or a pool of DMRS resources that can be used for grant free signaling; or 4) Indicating the possible modulation and coding schemes that UEs may use for grant free signaling. For example with regard to the fourth parameter, the gNB may indicate a limited set of valid MCS that may be used for grant free transmissions (according to the perceived UL interference in the grant free resources). And, the gNB may blindly decode the received grant less signals for the valid list of MCS. No explicit indication of MCS is required on the UL. Alternatively, the UE may use a few bits to indicate the MCS as the set of valid MCS may be small. A fifth parameter may include indicating the power level or an equivalent metric to enable UE to select the appropriate MCS for transmission. For example with regard to the fifth parameter, if the grant free transmission may occur in resources that carry eMBB transmissions, the level of interference due to eMBB transmission may be conveyed to the grant free UEs by the gNB so that they can adjust their modulation and coding accordingly.

Figure 19:
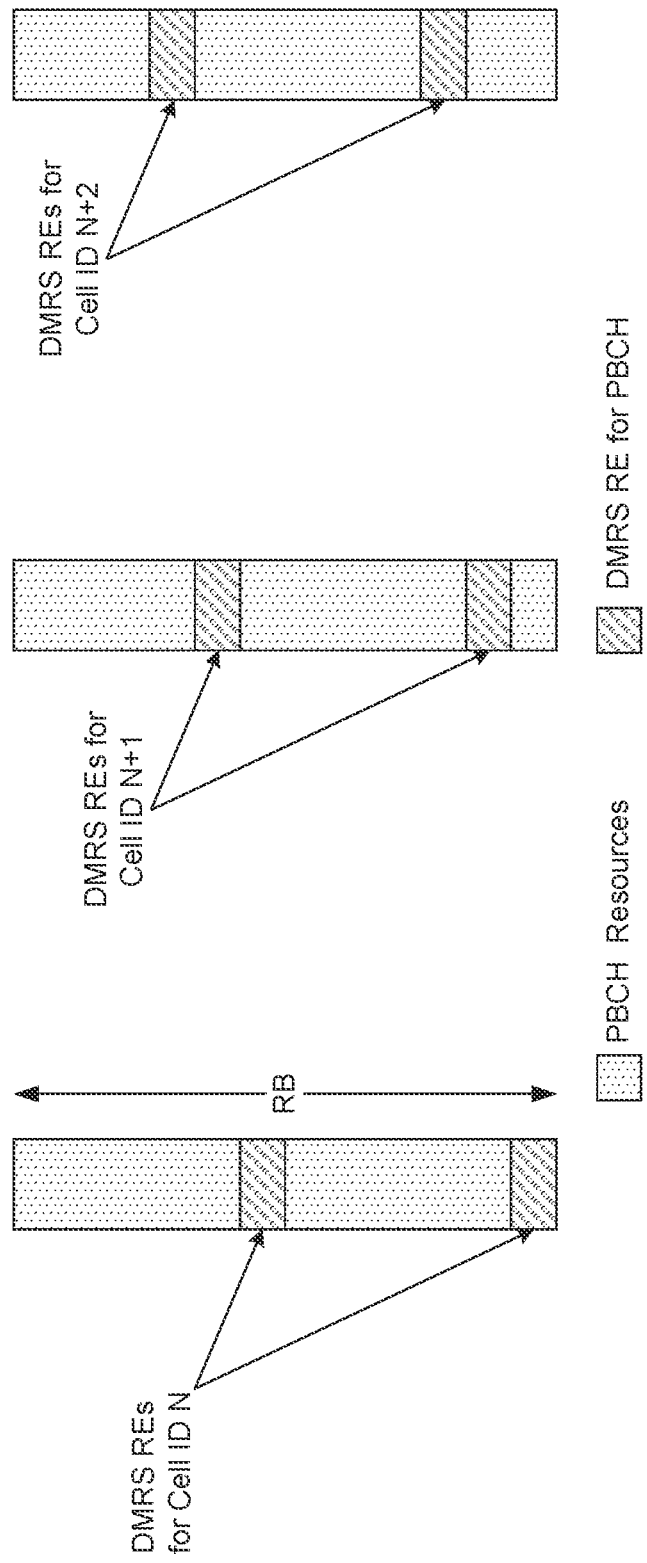
FIG. 19 illustrates an exemplary DMRS RE resource is a function of cell ID

DMRS design for PBCH may include: 1) The DMRS sequence is a function of the cell ID; 2) The DMRS location is a function of the cell ID (e.g., shown in FIG. 19, the RE of the DMRS within a symbol may vary with cell ID); or 3) The DMRS sequence or resources may be a function of the SS Block timing.

Figure 20:
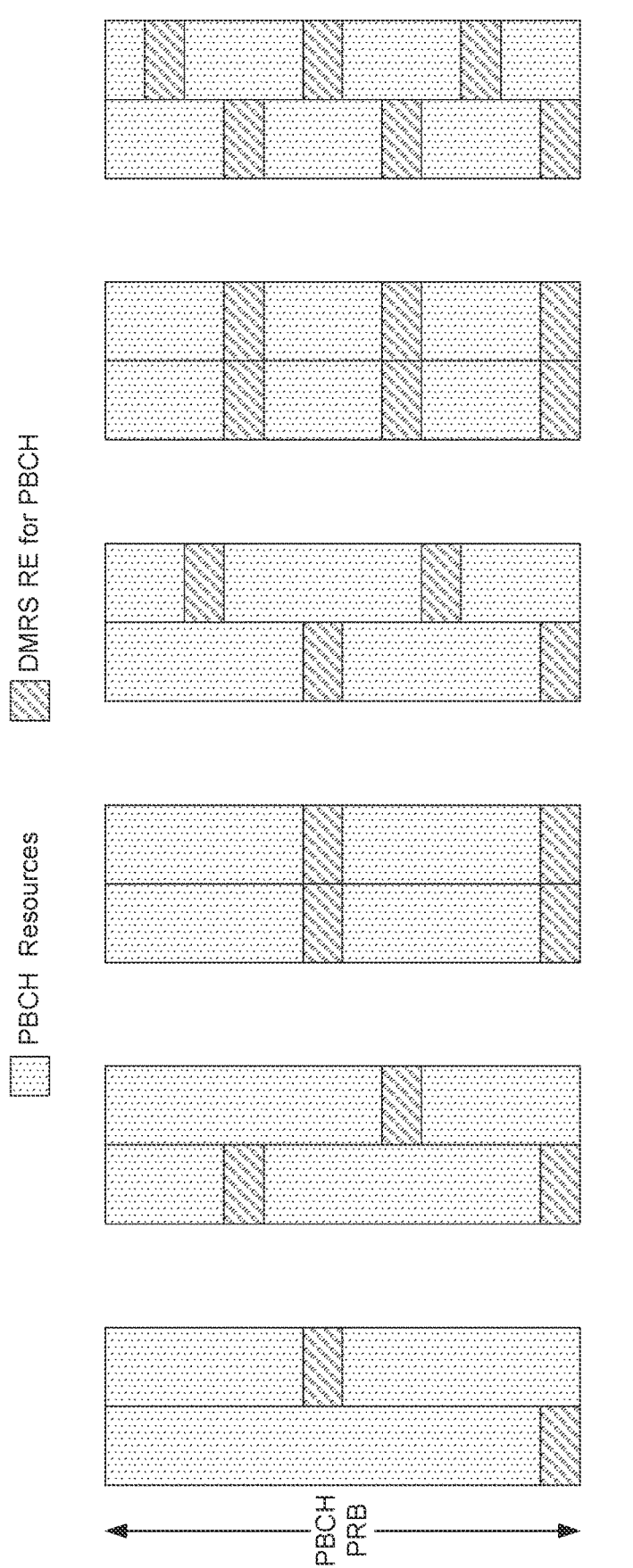
FIG. 20A illustrate exemplary DMRS densities for PBCH signaling per PRB-1 RE/PRB/symbol, staggered between the PBC symbols.
FIG. 20B illustrate exemplary DMRS densities for PBCH signaling per PRB-1.5 RE/PRB/symbol, staggered between the PBCH symbols.
FIG. 20C illustrate exemplary DMRS densities for PBCH signaling per PRB-1.5 RE/PRB/symbol, no staggering between the PBCH symbols.
FIG. 20D illustrate exemplary DMRS densities for PBCH signaling per PRB-2 RE/PRB/symbol, staggered between the PBCH symbols.
FIG. 20E illustrate exemplary DMRS densities for PBCH signaling per PRB-3 RE/PRB/symbol, no staggering between the PBCH symbols.
FIG. 20F illustrate exemplary DMRS densities for PBCH signaling per PRB-3 RE/PRB/symbol, staggered between the PBCH symbols.

NR may specify the density of the DMRS in the range between 8% to 33% of PBCH Res. Simulation shows that a density in that range is useful. FIG. 20 shows example of different RS densities ranging from 1 RE per RB per symbol to 3 REs per RB per symbol. Furthermore, the desired DMRS density is achieved by evenly distributing the DMRS REs between the 2 PBCH symbols. The DMRS REs in the 2 symbols may be staggered with respect to each other (FIG. 20A, FIG. 20B, FIG. 20D, FIG. 20F) or may occupy the same frequency resources (FIG. 20C, FIG. 20E).

Figure 21:
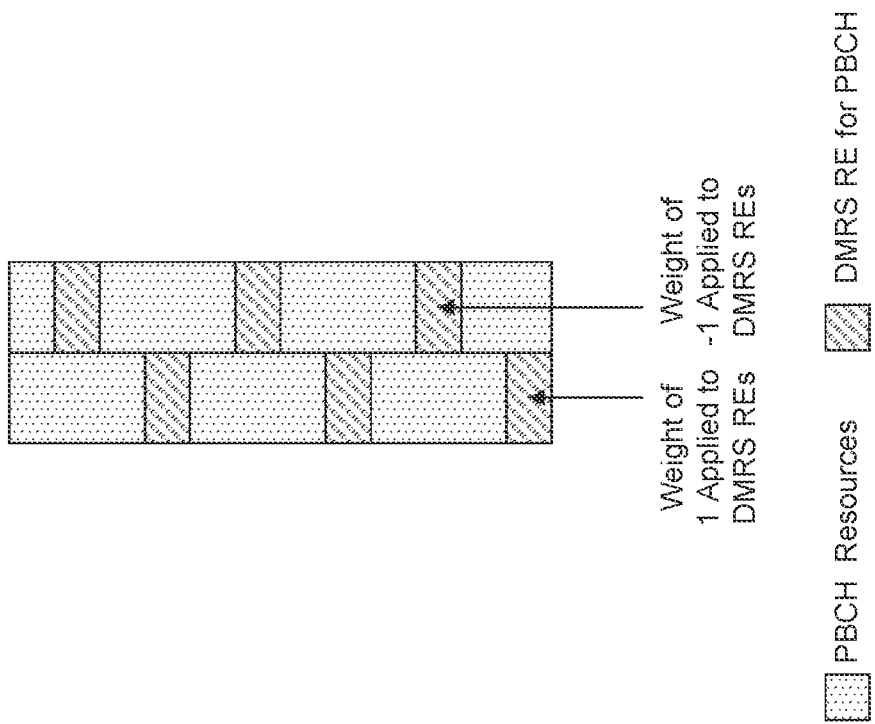
FIG. 21 illustrates an exemplary OCC for the DMRS pair across the PBCH symbols.

Furthermore, the same DMRS sequences may be used in both symbols and an OCC may be used over pairs of DMRS across the 2 symbols as shown in FIG. 21 to reduce inter-beam, intra-cell or inter-cell interference. In this example, an OCC with weights [1, −1] is applied to the DMRS REs in the two symbols.

Figure 22:
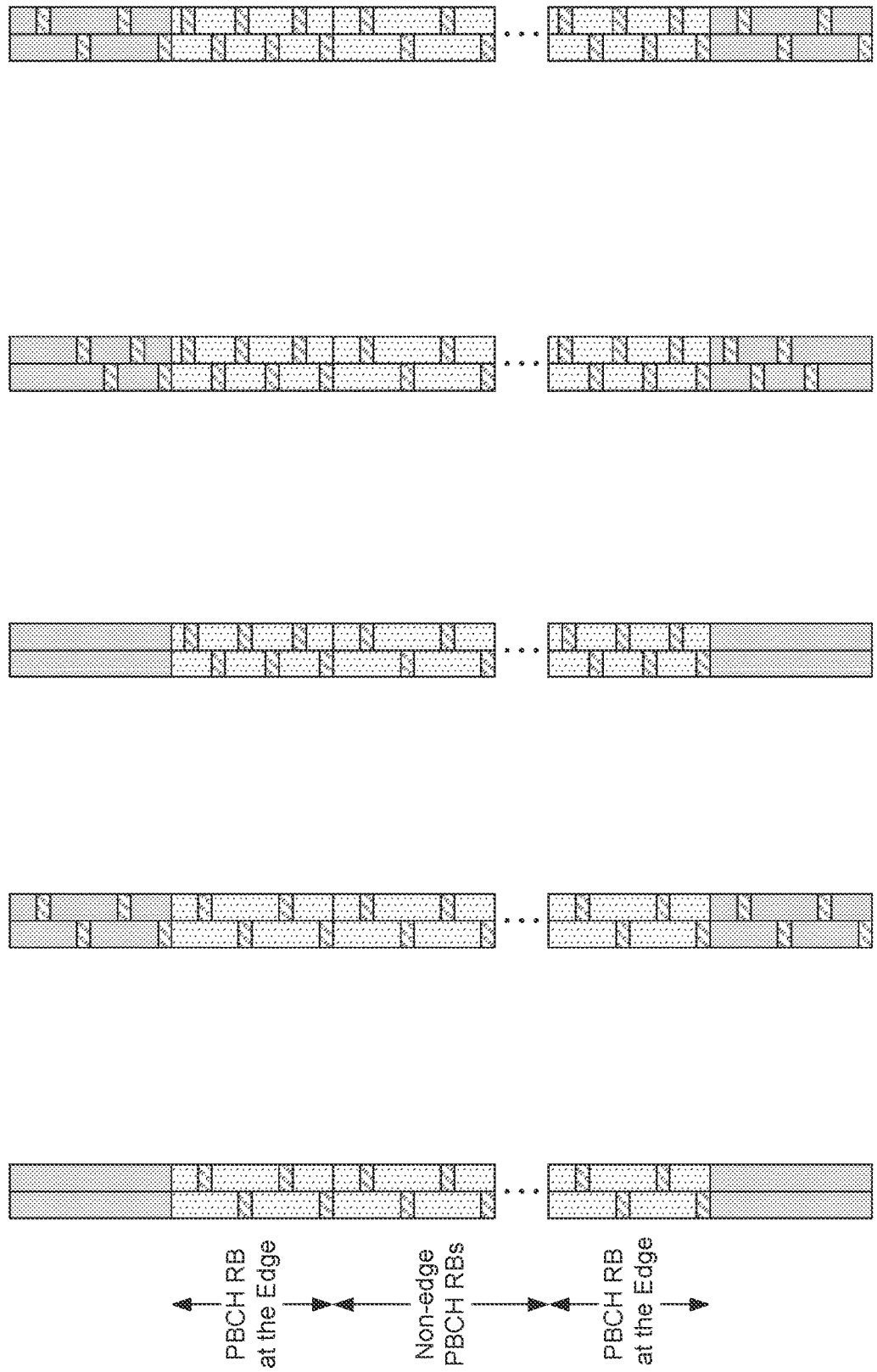
FIG. 22A illustrate exemplary DMRS configuration for PBCH-DMRS allocated within PRBs of PBCH, uniformly distributed between the PRBs.
FIG. 22B illustrate exemplary DMRS configuration for PBCH-DMRS extends across 1 PRB beyond the PBCH, uniformly distributed between the PRBs.
FIG. 22C illustrates exemplary DMRS configuration for PBCH-DMRS allocated within PRBs of PBCH, but denser in PRBs near the edge of PBCH.
FIG. 22D illustrate exemplary DMRS configuration for PBCH-DMRS extends across 1 PRB beyond the PBCH, denser at the edge; DMRS in extended PRB is distributed only in REs close to the edge.
FIG. 22E illustrate exemplary DMRS configuration for PBCH-DMTS in extended PRB is less dense but distributed throughout the PRB than the edge PRB.

FIG. 22A-22E illustrate exemplary DMRS configuration for PBCH. The PBCH may occupy 24 RBs per symbol. The channel estimation may be poor at the edges of this 24 RBs region due to discontinuation of the PBCH-DMRS as shown in FIG. 22A. Disclosed below (e.g., FIG. 22B-FIG. 22E) are implementations that may enhance channel estimation at the band edges of the PBCH.

In FIG. 22B DMRS may extend across 1 PRB beyond the PBCH, uniformly distributed between the PRBs. DMRS resources for PBCH may extend beyond the 24 RBs. The signals in these extended RBs may be rate matched or punctured to accommodate the PBCH DMRS. FIG. 22B shows such an example. The DMRS resources may be extended partially or fully through the extra RBs.

In FIG. 22C DMRS may be allocated within PRBs of PBCH, but denser in PRBs near the edge of PBCH. DMRS resources may be denser in the RBs near the edges, as seen in FIG. 22C, where the RB in the edge has 3 DMRS REs/RB/symbol whereas the RBs not at the edge carry only 2 DMRS REs/RB/symbol. The DMRS are denser in the RB at the edge compared to RBs in the non-edge region. The density may be measured by number of DMRS REs per RN per symbol.

Variable density and extended DMRS allocation may both be applied as shown in FIG. 22D and FIG. 22DE. In FIG. 22D, the DMRS in the extended region has lower density (on a per RB basis) than the band edge RB and partially occupies the DMRS REs in that RB. In FIG. 22E, the DMRS in the extended region has lower density (on a per RB basis) than the band edge RB, but occupies REs spanning the bandwidth of the RB. Note that wider the DMRS REs in the extended region, better the suppression of band edge ringing in the channel estimation.

Within a SS burst block, the PBCH-DMRS may be used for PBCH data demodulation.

Figure 23:
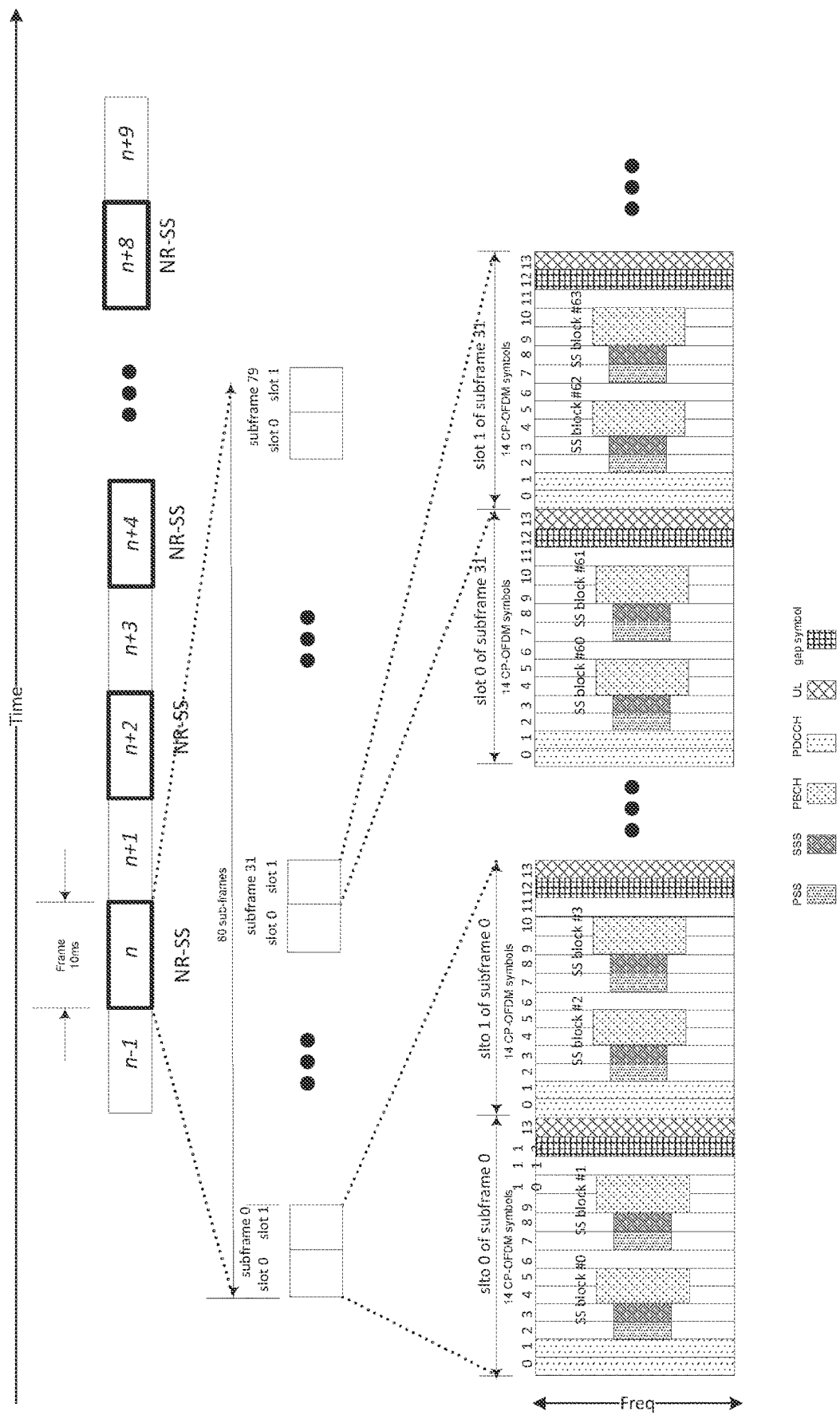
FIG. 23 illustrates an exemplary A SS burst consists of $N_{SS\_Blk}=64$, each slot contains 2 SS blocks.

The DMRS sequence r(m) for PBCH is defined by $$r_{n_s}(m) = \frac{1}{\sqrt{2}}(1 - 2c(2m)) + j\frac{1}{\sqrt{2}}(1 - 2c(2m+1)),$$

where c(i), i=1, ..., Q is the base sequence for PBCH-DMRS, Q is the PBCH DMRS length, $n_s$ is the SS block ID within a SS burst set. The base sequence c(i) can be built from a gold sequence or a m-sequence. The pseudo-random sequence generator can be initialized via the following function $$c_{init} = f(N_{ID}^{Cell}, n_s),$$

where $N_{ID}^{Cell}$ is the Cell ID which is derived from PSS and SSS and $n_s$ is the SS block timing index (or offset) within a SS burst set. The $n_s$ can be defined in the following:

$$n_s = 0, \ldots N_{SS\_Blk} - 1,$$

where $N_{SS\_Blk}$ is the number of SS blocks in a SS burst set. A SS burst set design, SS block and the timing indicating of $n_s$ is given in FIG. 23 (assume SCS=120 KHz):

In FIG. 23, the number of SS blocks in a SS burst set is set to 64, e.g., $N_{SS\_Blk}$=64 and there are 2 SS blocks in each time slot. In FIG. 23, this SS burst set complete 64 beams sweeping within 4 ms. The pseudo-random sequence generator may be initialized with $$c_{init} = 2^\tau \cdot (\delta \cdot (n_s' + 1) + 1) \cdot (2 \cdot N_{ID}^{cell} + 1) + 2 \cdot N_{ID}^{cell} + N_{CP}$$

$$n_s' = n_s$$

$$N_{CP} = \begin{cases} 1 & \text{for normal } CP \\ 0 & \text{for extended } CP \end{cases}$$

where $\delta = 2^r - 1$, r is a positive integer and may depend on numerology. For example, when r=4, δ=15. The value τ is a positive integer which is greater than $$\left\lfloor \frac{N_{PN}}{4} \right\rfloor,$$

where $N_{PN}$ denotes the Gold or PN sequence polynominal length, for example $N_{PN}$=31 or 63. The value $n_s$ in the PBCH DMRS may be used as the timing indication of SS block (SS block ID) within a SS burst.

The DMRS sequence to resource element may be described by the following method:

$$a_{k,n_s}^{(p)} = r_{n_s}(m),$$

where $a_{k,n_s}^{(p)}$ is DMRS at the k-th subcarrier (RE) and at the $n_s$-th SS block, p is the port ID, (e.g p=0) and m' is a mapping function of DMRS sequence index m. For example, the subcarrier mapping may be defined in the following:

$$k = \Delta \cdot m + \text{mod}(v_{shift}, \Delta),$$

where mod(•) is the modular operation, Δ is the DMRS separation, e.g., Δ=2 to Δ=4, $v_{shift}$ is a shift variable which is defined as $$v_{shift} = \text{mod}(N_{ID}^{Cell}, \Delta).$$

Besides, the PBCH DMRS may have different power allocation than PBCH data by power boosting option. The power boosting indication may be signaling via SSS. The SSS may carry 1 or 2 bits information (via PBSK or QPSK on SSS) to indicate the power boosting of PBCH DMRS. The power boosting (or power offset) indication may depend on the information bit. For example, if BPSK is used, then 0 may present no power boosting and 1 may present there is a power boosting. The power boosting value should be known to UE, e.g., a predefined value.

Sequence design for NR-CSI-RS, DMRS for PDSCH—In NR, PN sequences are defined by a length-31 Gold sequence. This Gold sequence can be used for NR-RS which are PBCH-DMRS, PDCCH-DMRS, PDSCH-DMRS and CSI-RS.

Assume the output gold sequence c(n) has a length of $N_{PN}$={31}, where n=0,1, ..., $N_{PN}$−1, PN sequence design can be specified in the following $$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Where $N_c$ is a scaler, e.g. $N_c$=1600 and the first m-sequence shall be initialized with $x_1(0)$=1, $x_1(n)$=1, n= 1,2, ..., $N_{PN}$−1. The initialization of $x_2$ is denoted by $c_{init} = \sum_{i=}^{N_{PN}-1} x_2(i) \cdot 2^i$ with the value depending on the application of the sequence.

For NR CSI-RS, the reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, \mu N_{RB}^{CSI} - 1$$

where $n_s$ is the slot number within a radio frame and l is the OFDM symbol number within the slot. The pseudo-random sequence c(i) is defined above. μ is the number of ports allocated for CSI-RS in a subframe which is a function of numerology. $N_{RB}^{CSI}$ is the allocated RBs based on a particular numerology. The pseudo-random sequence generator shall be initialised with $c_{init} = 2^{10} \cdot (L \cdot (n_s' + 1) + l + 1) \cdot (2 \cdot N_{ID}^{CSI} + 1) + 2 \cdot N_{ID}^{CSI} + N_{CP}$ at the start of each OFDM symbol where $$n_s' = \begin{cases} 10\lfloor n_s/10 \rfloor + n_s \bmod 2 & \text{for frame structure type 3} \\ & \text{when the CRI-RS is part of a DRS} \\ n_s & \text{otherwise} \end{cases}$$

$$N_{CP} = \begin{cases} 1 & \text{for normal } CP \\ 0 & \text{for extended } CP \end{cases}$$

$$L = \begin{cases} 7 & \text{for 7 symbols slot} \\ 14 & \text{for 14 symbols slot} \end{cases}$$

For PDSCH-DMRS antenna ports p∈{P, P+1, . . . , P+$N_p$−1}, where $N_p$ is the max number of PDSCH-DMRS ports, the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, \mu_1 N_{RB}^{PDSCH} & \text{normal cyclic prefix} \\ 0, 1, \ldots, \mu_2 N_{RB}^{PDSCH} & \text{extended cyclic prefix} \end{cases}$$

where $\mu_1$ is the number of ports allocated for PDSCH-DMRS in a subframe for normal cyclic prefix, $\mu_2$ is the number of ports allocated for PDSCH-DMRS in a subframe for extended cyclic prefix. Both $\mu_1$ and $\mu_2$ are a function of numerology. For example, the value of $\mu_1$ in 120 kHz numerology will not be same as the value in 60 kHz numerology. Pseudo-random sequence c(i) is defined as above. The pseudo-random sequence generator shall be initialised with $$c_{init} = (\lfloor n_s/2 \rfloor + 1) \cdot (2 \cdot n_{ID}^{(nSCID)} + 1) 2^{16} + n_{SCID}$$

at the start of each subframe.

Table 1 provides exemplary abbreviations used herein.

TABLE 1

| Abbreviations | |
|---|---|
| A/N | Ack/Nack |
| API | Application Program Interface |
| AS | Access Stratum |
| BCCH | Broadcast Control Channel |
| BCH | Broadcast Channel |
| BL | Bandwidth reduced Low complexity |
| BRS | Beam Reference Signal |
| CE | Control Element |
| CMAS | Commercial Mobile Alert System |
| CN | Core Network |
| CoMP | Coordinated Multi Point |
| CB | Code Block |
| CP | Cyclic Prefix |
| CRC | Cyclic Redundancy Check |
| C-RNTI | Cell Radio-Network Temporary Identifier |
| CSG | Closed Subscriber Group |
| DL | Downlink |
| DL-SCH | Downlink Shared Channel |
| DRX | Discontinuous Reception |
| DTX | Discontinuous Transmission |
| E2E | End to End |
| EAB | Extended Access Barring |
| eCell | Extended Cell |
| eDRX | Extended Discontinuous Reception |
| eMBB | enhanced Mobile Broadband |
| ENB | Evolved Node B |
| ETWS | Earthquake and Tsunami Warning System |
| EPDCCH | Enhanced Physical Downlink Control Channel |
| E-UTRA | Evolved Universal Terrestrial Radio Access |
| E-UTRAN | Evolved Universal Terrestrial Radio Access Network |
| FFS | For Further Study |
| GF | Grant free |
| GF-RS | Grant free transmissions |
| GL-RNTI | GrantLess RNTI |
| GLAR | GrantLess Access Response |
| GP | Guard Period |
| HARQ | Hybrid Automatic Repeat Request |
| HD | High Definition |
| IE | Information element |
| IOT | Internet of Things |
| IMT | International Mobile Telecommunications |
| KPI | Key Performance Indicators |
| LC-MTC | Low Cost or Low Complexity Machine-Type Communications |
| LTE | Long term Evolution |
| MAC | Medium Access Control |
| MBB | Mobile Broadband |
| MIB | Master Information Block |
| MTC | Machine-Type Communications |
| mMTC | massive Machine Type Communication |
| NAS | Non-access Stratum |
| NACK | Non-ACKnowledgement |
| NR | New Radio |
| OCC | Orthogonal Covering Code |
| OFDM | Orthogonal frequency division multiplexing |
| PDCCH | Physical Downlink Control Channel |
| PBCH | Physical Broadcast Channel |
| PDCCH | Physical Downlink Control Channel |
| PDSCH | Physical Downlink Shared Data Channel |
| PHICH | Physical Hybrid ARQ Indicator Channel |
| PMCH | Physical Multicast Channel |
| PUSCH | Physical Uplink Shared Channel |
| PUCCH | Physical Uplink Control Channel |
| PRACH | Physical Random Access Channel |
| PRB | Physical Resource Block |
| R-PDCCH | Relay-Physical Downlink Control Channel |
| RAN | Radio Access Network |
| RAT | Radio Access Technology |
| RB | Resource block |
| RE | Resource Element |
| RNTI | Radio Network Temporary Identifier |
| RRC | Radio Resource Control |
| RV | Redundancy Version |
| sTTI | Short TTI |
| yTTI | Transmission time interval of variable duration |
| SC-FDMA | Single carrier frequency division multiple access |
| SDU | Service Data Unit |
| SFN | System Frame Number |
| SI | System Information |
| SIB | System Information Block |
| SIBe | SIB Essential |
| SIPF | SI Provisioning Function |
| SI-RNTI | System Information RNTI |
| SPS-RNTI | Semi persistent scheduling RNTI |
| SMARTER | Feasibility Study on New Services and Markets Technology |
| SR | Scheduling Request |
| TAU | Tracking Area Update |
| TBS | Transport Block Size |
| TB | Transport Block |
| TDD | Time Division Duplex |
| TRP | Transmission and Reception Point |
| TTI | Transmission Time Interval |
| UE | User Equipment |
| UHD | Ultra high definition |
| UL | Uplink |
| UR/LL | Ultra Reliable - Low Latency |
| URLLC | Ultra-Reliable and Low Latency Communications |
| WLAN | Wireless Local Area Network |

Figure 24:
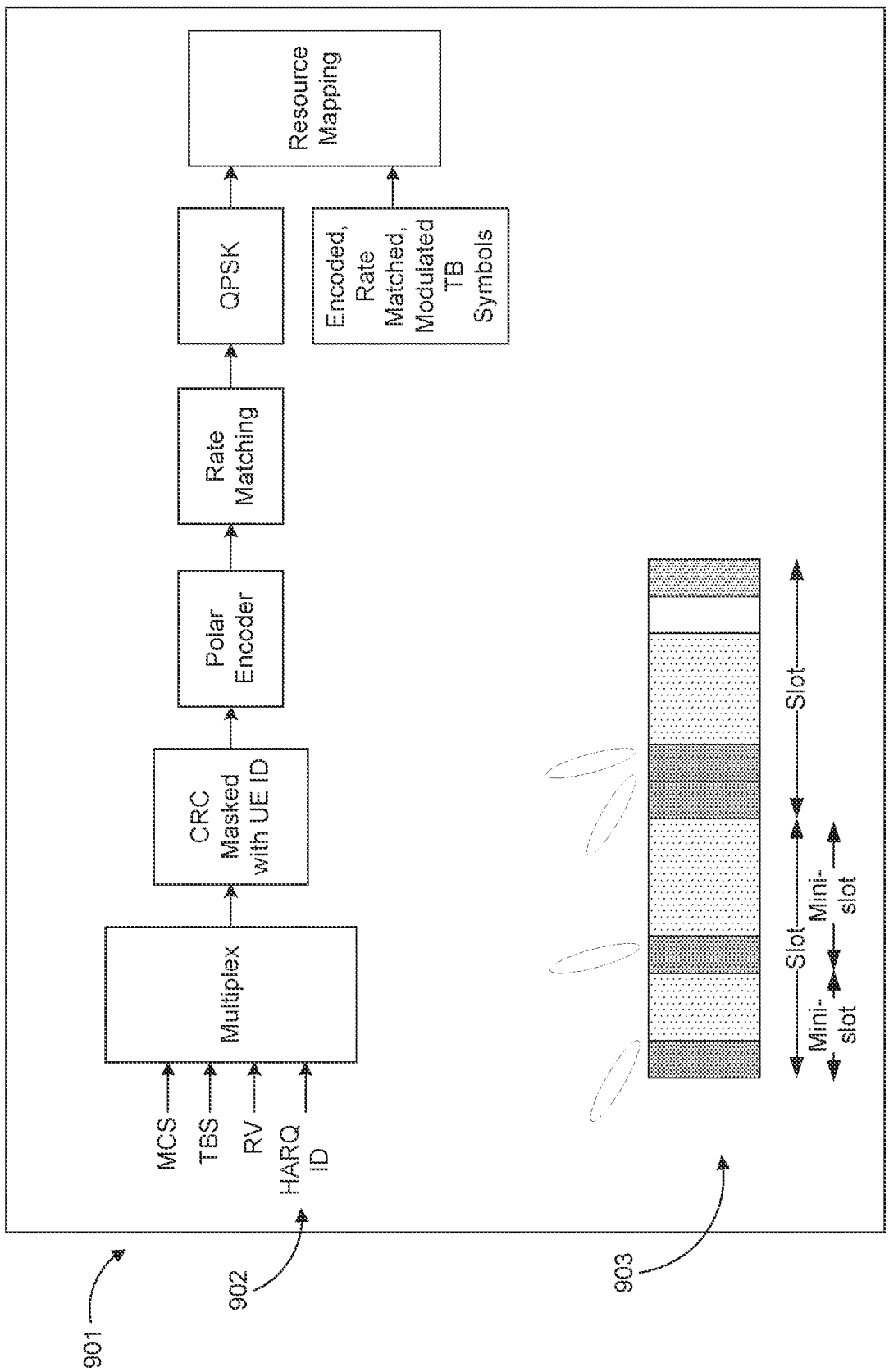
FIG. 24 illustrates an exemplary display (e.g., graphical user interface) that may be generated based on the methods and systems of beam based DL control signaling.

FIG. 24 illustrates an exemplary display (e.g., graphical user interface) that may be generated based on the methods and systems of beam based DL control signaling, as disclosed herein. Display interface 901 (e.g., touch screen display) may provide text in block 902 associated with of beam based DL control signaling, such as GF control region related parameters, indications of change in monitoring occasions, and identification of GF UL transmission using GF-RS in DFT-s-PFDM and CP-OFDM scenarios, among other things, as disclosed herein. Progress of any of the steps (e.g., sent messages or success of steps) discussed herein may be displayed in block 902. In addition, graphical output 902 may be displayed on display interface 901. Graphical output 903 may be the topology of the devices implementing the methods and systems of beam based DL control signaling, a graphical output of the progress of any method or systems discussed herein, slots in use, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific services and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile interne, and virtual reality to name a few. All of these use cases and others are contemplated herein.

Figure 25A:
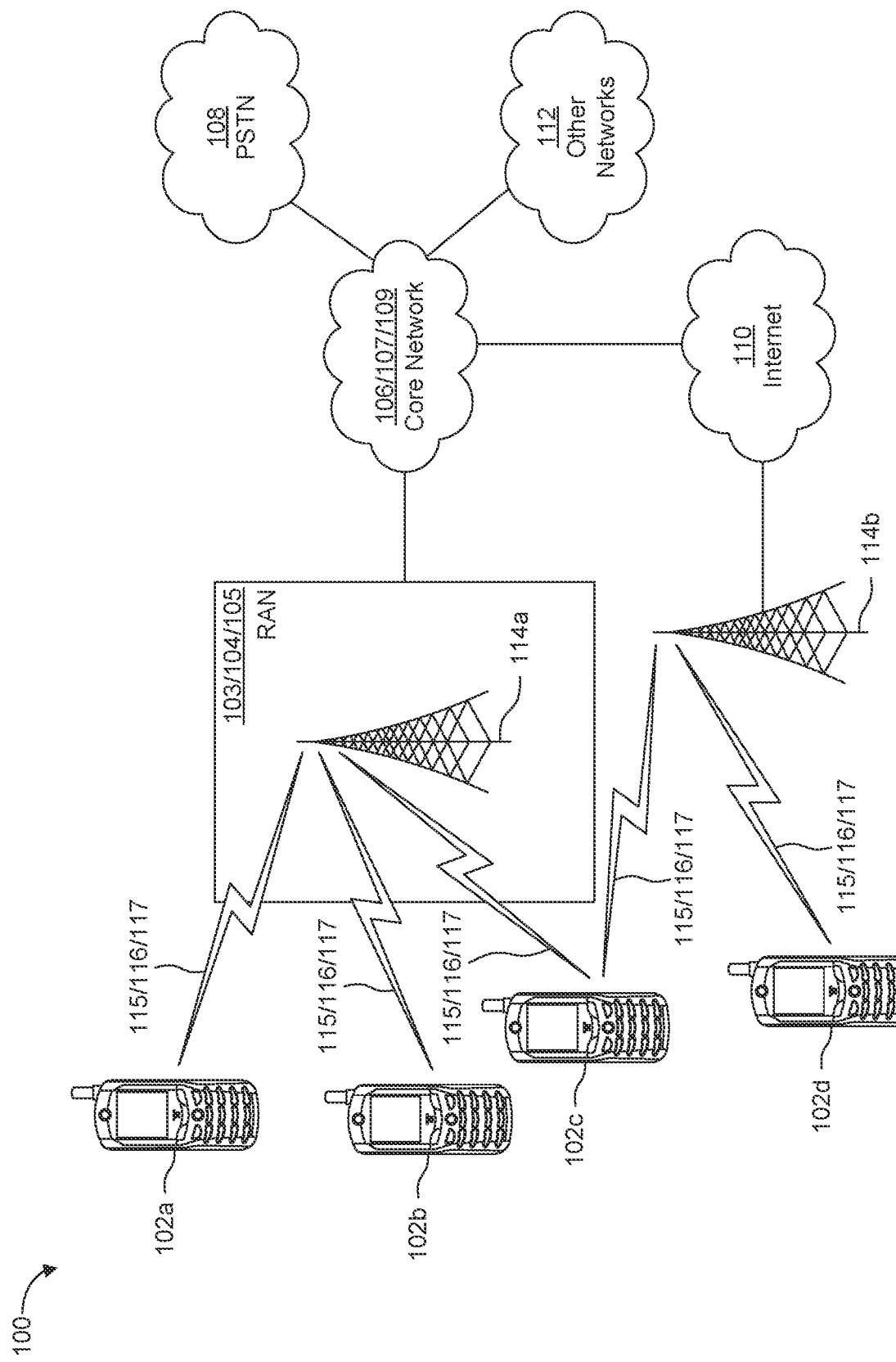
FIG. 25A illustrates an example communications system.

FIG. 25A illustrates an example communications system 100 in which the methods and apparatuses of beam based DL control signaling, such as the systems and methods illustrated in FIG. 1 through FIG. 23 described and claimed herein may be embodied. As shown, the example communications system 100 may include wireless transmit/receive units (WTRUs) 102a, 102b, 102c, or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed examples contemplate any number of WTRUs, base stations, networks, or network elements. Each of the WTRUs 102a, 102b, 102c, 102d, 102e may be any type of apparatus or device configured to operate or communicate in a wireless environment. Although each WTRU 102a, 102b, 102c, 102d, 102e is depicted in FIG. 25A, FIG. 25B, FIG. 25C, FIG. 25D, and FIG. 25E as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, or the other networks 112. Base stations 114b may be any type of device configured to wiredly or wirelessly interface with at least one of the RRHs (Remote Radio Heads) 118a, 118b or TRPs (Transmission and Reception Points) 119a, 119b to facilitate access to one or more communication networks, such as the core network 106/107/109, the Internet 110, or the other networks 112. RRHs 118a, 118b may be any type of device configured to wirelessly interface with at least one of the WTRU 102c, to facilitate access to one or more communication networks, such as the core network 106/107/109, the Internet 110, or the other networks 112. TRPs 119a, 119b may be any type of device configured to wirelessly interface with at least one of the WTRU 102d, to facilitate access to one or more communication networks, such as the core network 106/107/109, the Internet 110, or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations or network elements.

The base station 114a may be part of the RAN 103/104/105, which may also include other base stations or network elements (not shown), such as a base station controller (BSC), a radio network controller (RNC), relay nodes, etc. The base station 114b may be part of the RAN 103b/104b/105b, which may also include other base stations or network elements (not shown), such as a base station controller (BSC), a radio network controller (RNC), relay nodes, etc. The base station 114a may be configured to transmit or receive wireless signals within a particular geographic region, which may be referred to as a cell (not shown) for methods and systems of beam based DL control signaling, as disclosed herein. The base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 may implement 3GPP NR technology.

In an example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 25A may be a wireless router, Home Node B, Home eNode B, gNB, or access point, for example, and may utilize any suitable RAT for facilitating wireless connectivity in a localized area, such as a place of business, a home, a vehicle, a campus, and the like, for implementing the methods and systems of beam based DL control signaling, as disclosed herein. In an example, the base station 114c and the WTRUs 102e, may implement a radio technology such as IEEE 802.11 to establish a wireless local area network (WLAN). In an example, the base station 114c and the WTRUs 102d, may implement a radio technology such as IEEE 802.15 to establish a wireless personal area network (WPAN). In yet another example, the base station 114c and the WTRUs 102e, may utilize a cellular-based RAT (e.g., WCDMA, CDMA2000, GSM, LTE, LTE-A, etc.) to establish a picocell or femtocell. As shown in FIG. 25A, the base station 114b may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., or perform high-level security functions, such as user authentication.

Although not shown in FIG. 25A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 25A may be configured to communicate with the base station 114a, which may employ a cellular-based radio technology, and with the base station 114c, which may employ an IEEE 802 radio technology.

Figure 25B:
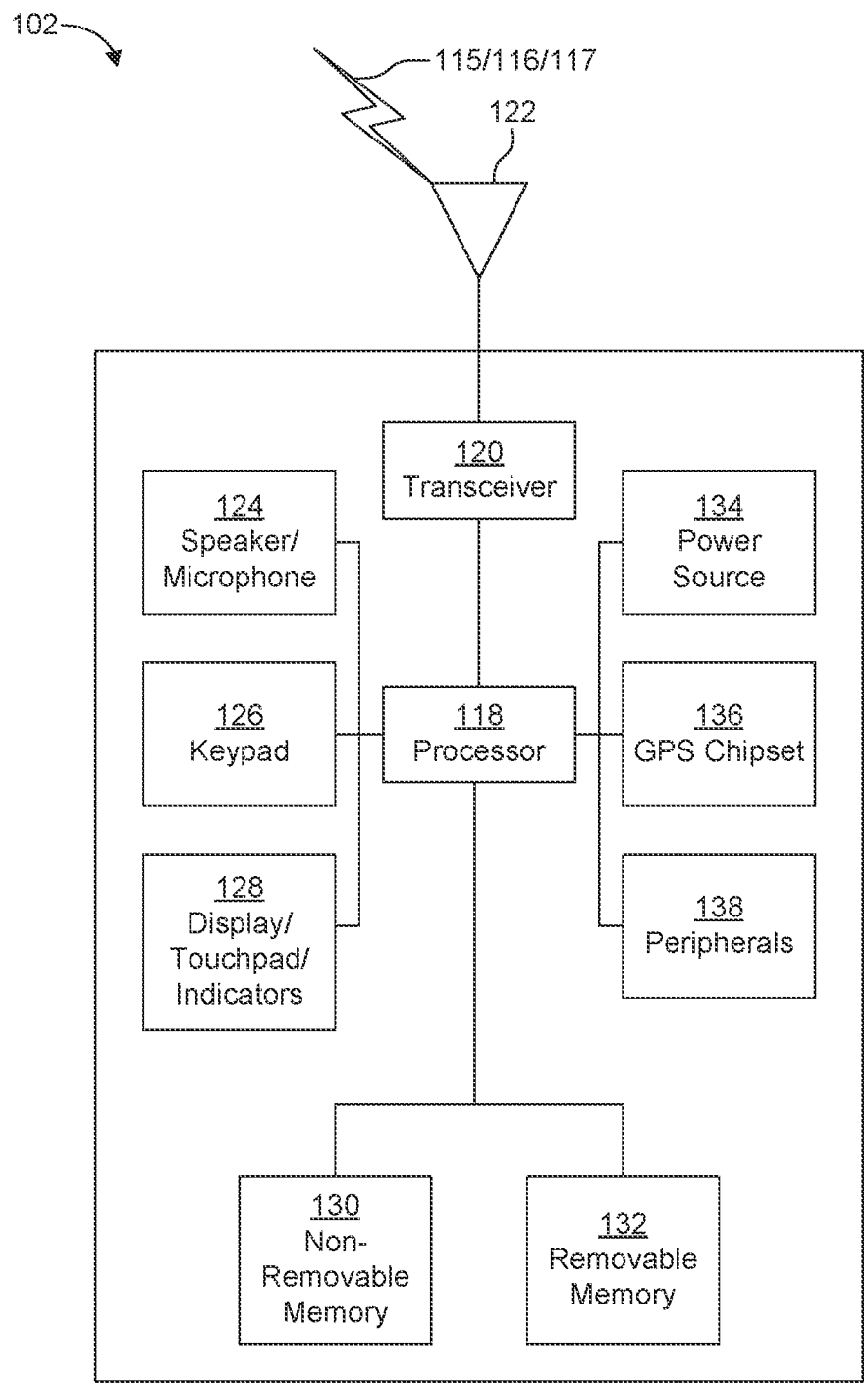
FIG. 25B is a block diagram of an example apparatus or device configured for wireless communications such as, for example, a wireless transmit/receive unit (WTRU)

FIG. 25B is a block diagram of an example apparatus or device configured for wireless communications in accordance with the examples illustrated herein, such as for example, a WTRU 102. As shown in FIG. 25B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, examples contemplate that the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 25B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 25B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit or receive RF signals. In an example, the transmit/receive Although not shown in FIG. 25A, it will be appreciated that the RAN 103/104/105 or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links for implementing methods and systems of beam based DL control signaling, as disclosed herein. For example, the WTRU 102c shown in FIG. 25A may be configured to communicate with the base station 114a, which may employ a cellular-based radio technology, and with the base station 114b, which may employ an IEEE 802 radio technology.

FIG. 25B is a block diagram of an example apparatus or device configured for wireless communications in accordance with methods and systems of beam based DL control signaling, as disclosed herein, such as for example, a WTRU 102 (e.g., UEs involved with Multi beam PDCCH transmission or). As shown in FIG. 25B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, the examples herein contemplate that the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), gNB, a home evolved node-B gateway, and proxy nodes, among others, may include some or all of the elements depicted in FIG. 25B and may be an exemplary implementation that performs the disclosed systems and methods for device triggering described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 25B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit or receive RF signals. In an example, the transmit/receive element 122 may be an emitter/detector configured to transmit or receive IR, UV, or visible light signals, for example. In yet another example, the transmit/receive element 122 may be configured to transmit and receive both RF and light signals. It will be appreciated that the transmit/receive element 122 may be configured to transmit or receive any combination of wireless signals.

In addition, although the transmit/receive element 122 is depicted in FIG. 25B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit). The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer (not shown). The processor 118 may be configured to control lighting patterns, images, or colors on the display or indicators 128 in response to whether the setup associated with multi beam PDCCH transmission in some of the examples described herein are successful or unsuccessful, or otherwise indicate a status of beam based DL control signaling and associated components. The control lighting patterns, images, or colors on the display or indicators 128 may be reflective of the status of any of the method flows or components in the FIGS. illustrated or discussed herein (e.g., FIG. 1-FIG. 23, etc.). Disclosed herein are messages and procedures of beam based DL control signaling. The messages and procedures may be extended to provide interface/API for users to request resource-related resources via an input source (e.g., speaker/microphone 124, keypad 126, or display/touchpad/indicators 128) and request, configure, or query beam based DL control signaling related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software or hardware modules that provide additional features, functionality or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 25C:
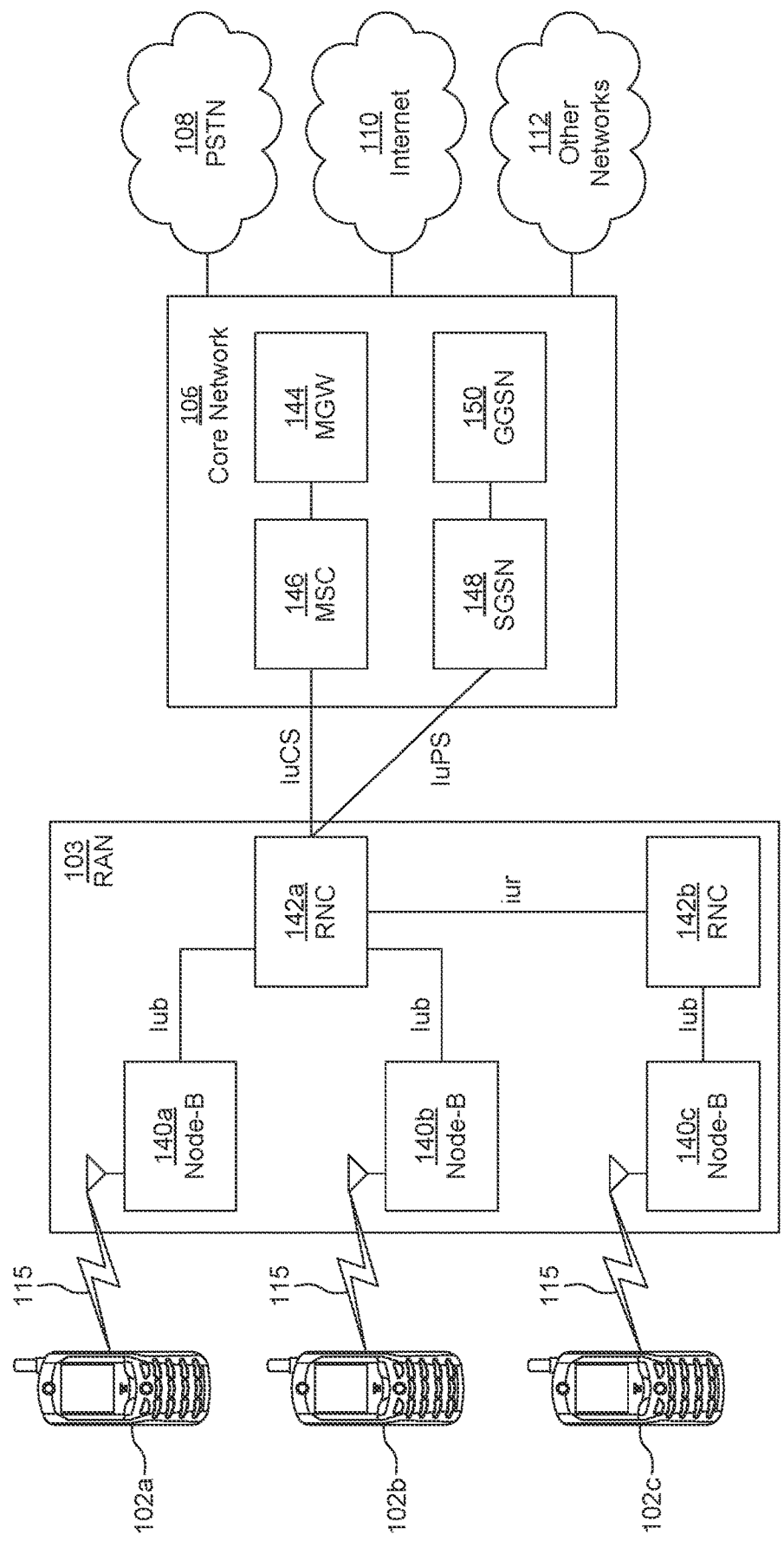
FIG. 25C is a system diagram of a first example radio access network (RAN) and core network.

FIG. 25C is a system diagram of the RAN 103 and the core network 106 that may implement the methods and systems of beam based DL control signaling, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 25C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an example.

As shown in FIG. 25C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 25C may include a media gateway (MGW) 144, a mobile switching center (MSC) 146, a serving GPRS support node (SGSN) 148, or a gateway GPRS support node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned or operated by other service providers.

Figure 25D:
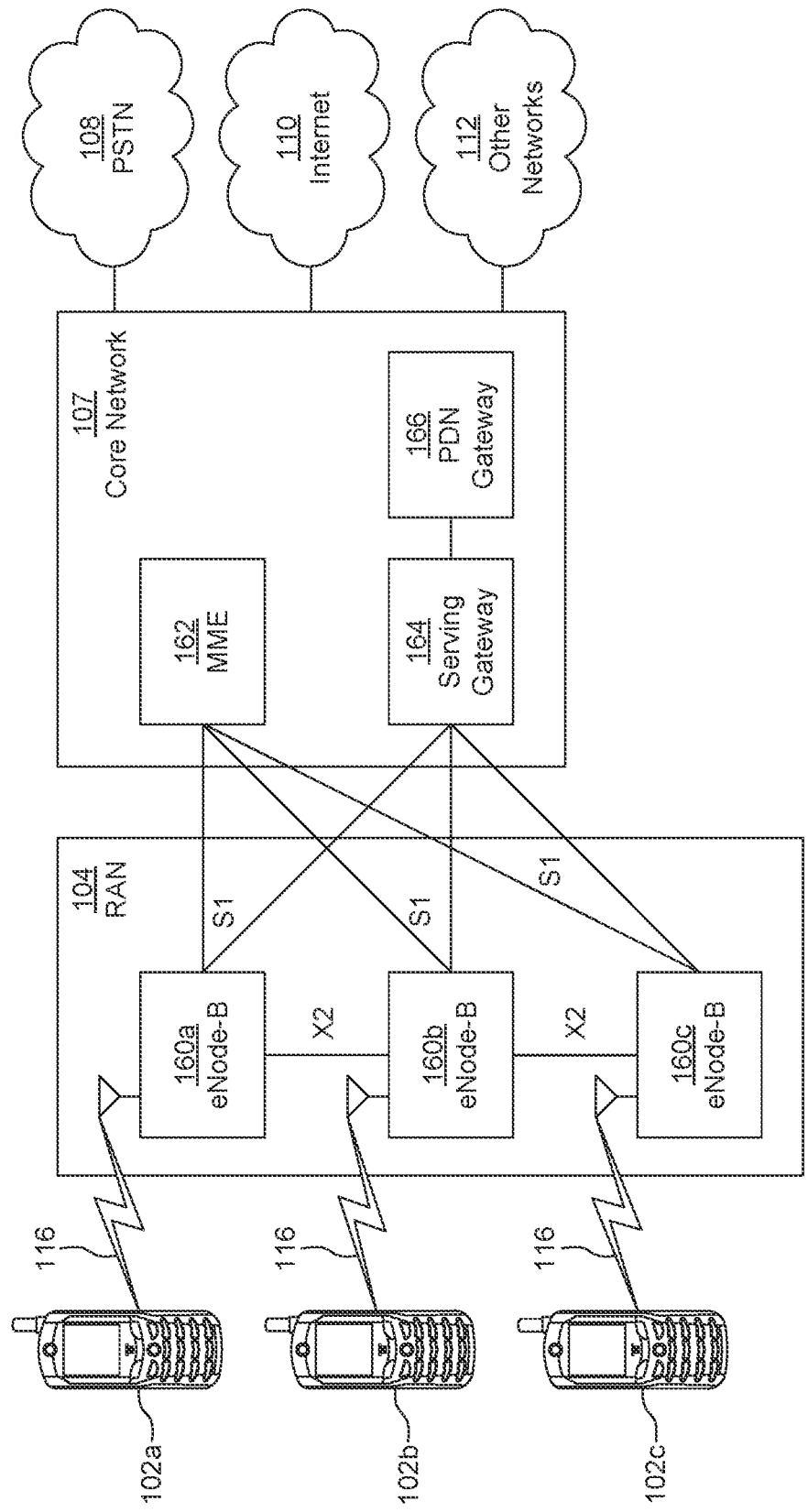
FIG. 25D is a system diagram of a second example radio access network (RAN) and core network.

FIG. 25D is a system diagram of the RAN 104 and the core network 107 that may implement methods and systems of beam based DL control signaling, as disclosed herein. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an example. The eNode-Bs 160*a*, 160*b*, 160*c* may each include one or more transceivers for communicating with the WTRUs 102*a*, 102*b*, 102*c* over the air interface 116. In an example, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink or downlink, and the like. As shown in FIG. 25D, the eNode-Bs 160*a*, 160*b*, 160*c* may communicate with one another over an X2 interface.

The core network 107 shown in FIG. 25D may include a mobility management gateway (MME) 162, a serving gateway 164, and a packet data network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned or operated by other service providers.

Figure 25E:
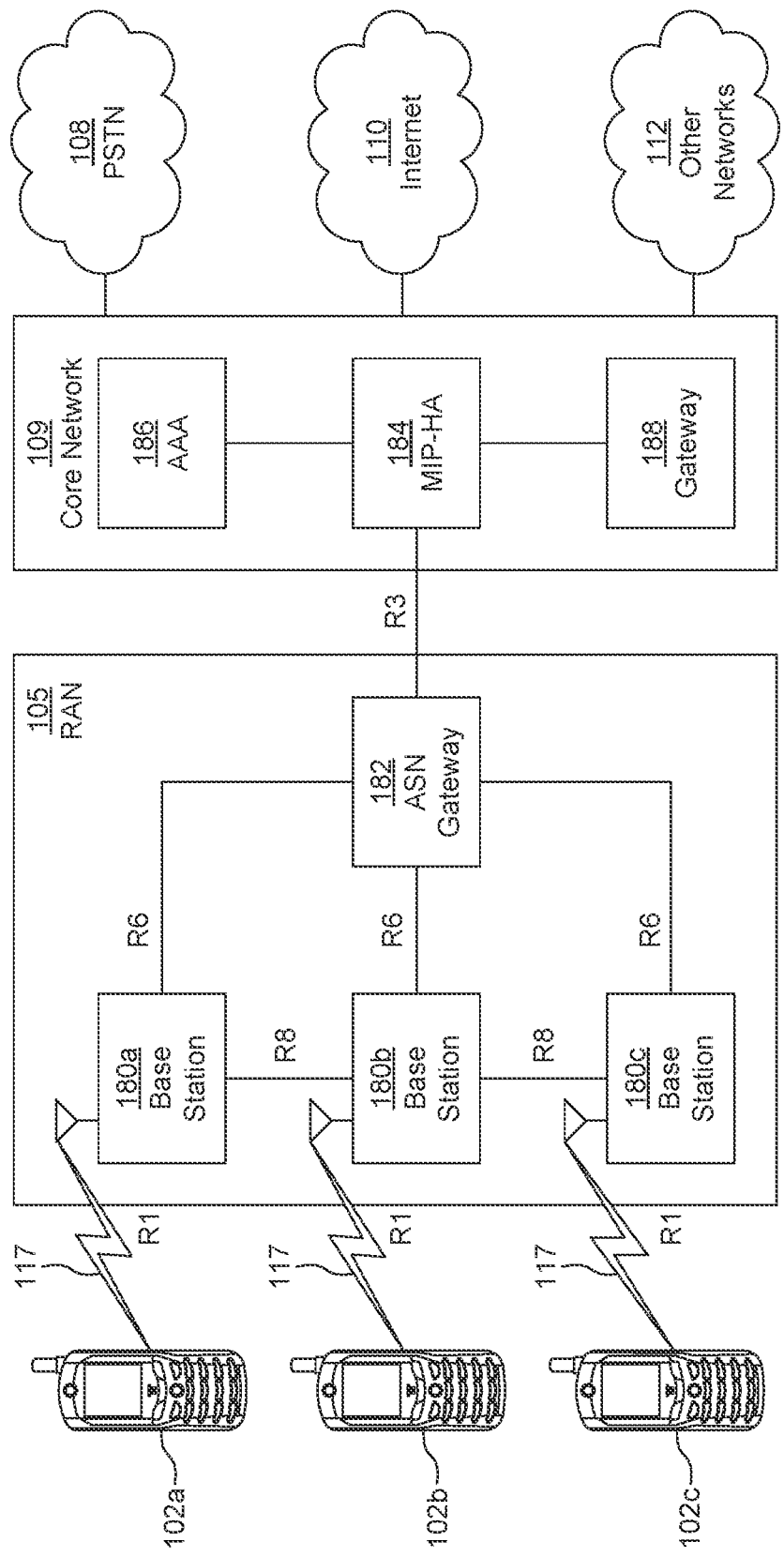
FIG. 25E is a system diagram of a third example radio access network (RAN) and core network.

FIG. 25E is a system diagram of the RAN 105 and the core network 109 that may implement methods and systems of beam based DL control signaling, as disclosed herein. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 25E, the RAN 105 may include base stations 180*a*, 180*b*, 180*c*, and an ASN gateway 182, though it will be appreciated that the RAN 105 may include any number of base stations and ASN gateways while remaining consistent with an example. The base stations 180*a*, 180*b*, 180*c* may each be associated with a particular cell in the RAN 105 and may include one or more transceivers for communicating with the WTRUs 102*a*, 102*b*, 102*c* over the air interface 117. In an example, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102a, 102b, 102c.

As shown in FIG. 25E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned or operated by an entity other than the core network operator.

The MIP-HA may be responsible for IP address management, and may enable the WTRUs 102a, 102b, and 102c to roam between different ASNs or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned or operated by other service providers.

Although not shown in FIG. 25E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIG. 25A, FIG. 25C, FIG. 25D, and FIG. 25E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 25A, FIG. 25B, FIG. 25C, FIG. 25D, and FIG. 25E are provided by way of example only, and it is understood that the subject matter disclosed and claimed herein may be embodied or implemented in any similar communication system, whether presently defined or defined in the future.

Figure 25F:
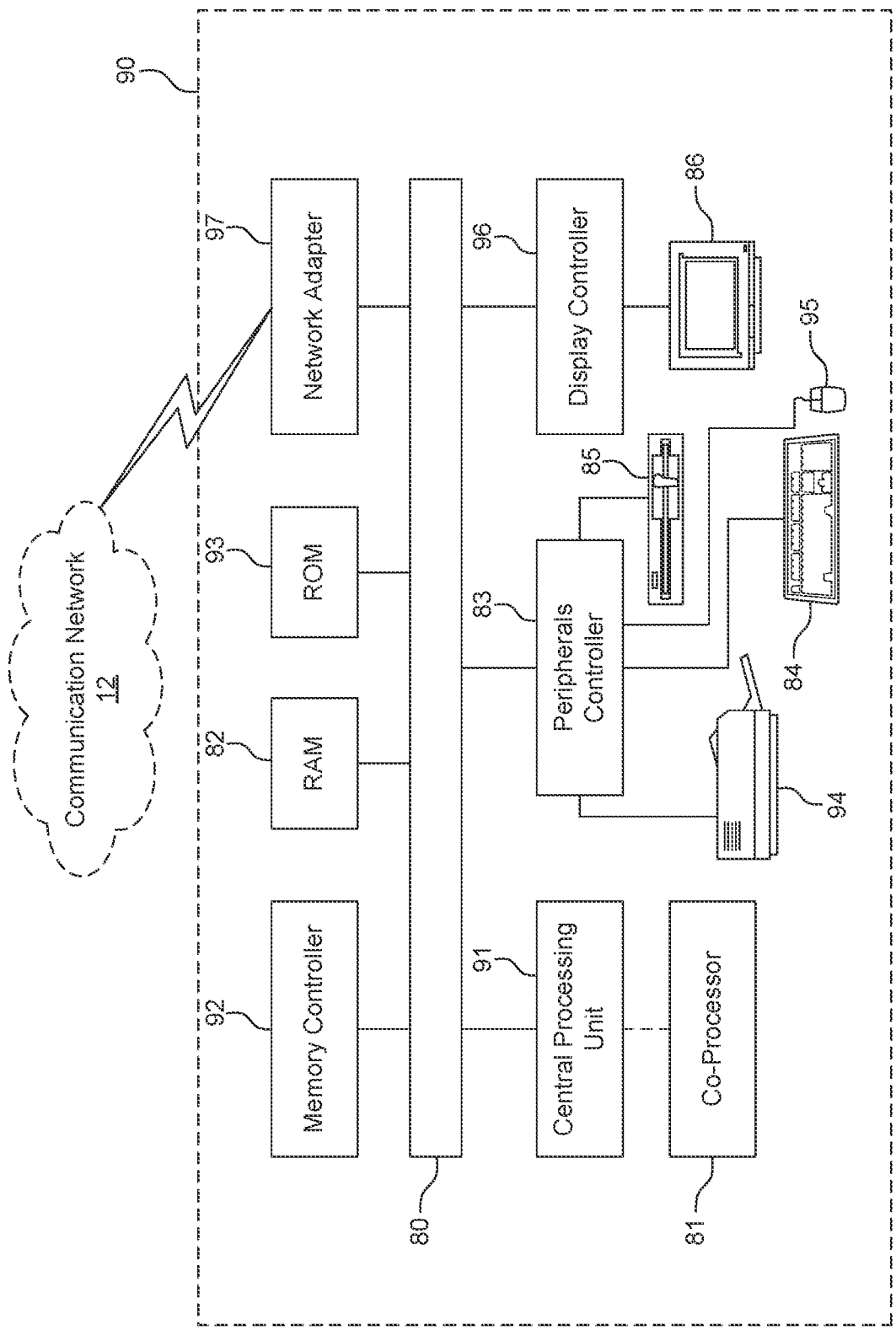
FIG. 25F is a block diagram of an exemplary computing system in which one or more apparatuses of communications networks may be embodied, such as certain nodes or functional entities in the RAN, core network, public switched telephone network (PSTN), Internet, or other networks.

FIG. 25F is a block diagram of an exemplary computing system 90 in which one or more apparatuses of the communications networks illustrated in FIG. 25A, FIG. 25C, FIG. 25D, and FIG. 25E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for beam based DL control signaling, such as change in monitoring occasions due to change in BPL.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIG. 25A, FIG. 25B, FIG. 25C, FIG. 25D, and FIG. 25E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations or functions described herein may be implemented in the form of such computer executable instructions, executing on the processor of an apparatus or computing system configured for wireless or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—beam based DL control signaling—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

A base station that performs wireless communication has means for sending a message to an apparatus via an RRC, MAC CE, or DCI updates, wherein the message to the apparatus comprise instructions to configure a monitoring occasion. An apparatus, method, or computer-readable storage medium may provide means for detecting control information as disclosed herein. A method, system, computer readable storage medium, or apparatus has means for determining one or more monitoring occasions for control information for a plurality of beams, wherein the one or more monitoring occasions are configured through one or more first plurality of radio resource controls (RRCs), and wherein the control information has an occurrence pattern in time; and based on the monitoring occasion, monitoring the plurality of beams. The control information may include time resources of the plurality of beams or frequency resources of the plurality of beams. The plurality of beams may be from one or more transmission reception points (TRP). The one or more monitoring occasions may be different for different types of common resource sets. The monitoring may be of common resource sets that have spatial quasi co-location with an SS block. The monitoring may be of common resource sets that are configured by the transmission reception point to be quasi co-located with an SS block. The monitoring may be of common resource sets that are configured by the transmission reception point to be quasi co-located with an SS block based on RRC. The apparatus may be a user equipment or TRP. All combinations in this paragraph (including the removal or addition of steps) are contemplated in a manner that is consistent with the other portions of the detailed description.

What is claimed:

1. A method comprising:
   monitoring, by a wireless transmit/receive unit (WTRU), in one or more monitoring occasions for control information,
      wherein the control information is received using a first beam, wherein the first beam is based on a physical downlink control channel (PDCCH) quasi co-located with a synchronization signal block (SSB); and
   based on the one or more monitoring occasions, receiving, by the WTRU, downlink control channel spatial information using the first beam,
      wherein the SSB is received using a second beam and the physical downlink control channel (PDCCH) transmission is received using the first beam, wherein the first beam and the second beam are received from a same direction and the SSB and PDCCH transmission are quasi co-located with respect to spatial quasi co-location parameters.

2. The method of claim 1, wherein the one or more monitoring occasions are different for different types of control resource sets.

3. The method of claim 1, wherein the one or more monitoring occasions are configured using radio resource control (RRC) signaling.

4. The method of claim 1, further comprising obtaining multiple downlink control informations (DCIs), wherein each of the multiple DCIs indicate a respective physical downlink shared channel grant, wherein each of the multiple DCIs indicate a same respective frequency resource for the respective physical downlink shared channel grant.

5. The method of claim 1, further comprising activating or deactivating grant free resources based on downlink control information.

6. The method of claim 1, further comprising obtaining time and frequency resources for grant free transmission based on downlink control information.

7. The method of claim 1, further comprising transmitting control signaling for a grant free resource in uplink control information, wherein the transmission comprises user equipment identifier.

8. An apparatus comprising:
a processor; and
memory coupled with the processor, the memory comprising executable instructions stored thereon that when executed by the processor cause the processor to effectuate operations comprising:
monitoring in one or more monitoring occasions for control information,
wherein the control information is received using a first beam, wherein the first beam is based on a physical downlink control channel (PDCCH) quasi co-located with a synchronization signal block (SSB); and
based on the one or more monitoring occasions, receiving downlink control channel spatial information using the first beam,
wherein the SSB is received using a second beam and the physical downlink control channel (PDCCH) transmission is received using the first beam, wherein the first beam and the second beam are received from a same direction and the SSB and PDCCH transmission are quasi co-located with respect to spatial quasi co-location parameters.

9. The apparatus of claim 8, wherein the apparatus is a wireless transmit/receive unit (WTRU).

10. The apparatus of claim 8, the operations further comprising obtaining multiple downlink control informations (DCIs), wherein each of the multiple DCIs indicate a respective physical downlink shared channel grant, wherein each of the multiple DCIs indicate a same respective frequency resource for the respective physical downlink shared channel grant.

11. The apparatus of claim 8, the operations further comprising activating or deactivating grant free resources based on downlink control information.

12. The apparatus of claim 8, the operations further comprising obtaining time and frequency resources for grant free transmission based on downlink control information.

13. The apparatus of claim 8, the operations further comprising transmitting control signaling for a grant free resource in uplink control information, wherein the transmission comprises user equipment identifier.

14. The apparatus of claim 8, the operations further comprising encoding together payload size, modulation coding scheme, and redundancy version in the control information.

15. The apparatus of claim 8, wherein the one or more monitoring occasions are configured using radio resource control (RRC) signaling.

16. A computer readable storage medium storing computer executable instructions that when executed by a computing device cause said computing device to effectuate operations comprising:
monitoring in one or more monitoring occasions for control information,
wherein the control information is received using a first beam, wherein first beam is based on a physical downlink control channel (PDCCH) quasi co-located with a synchronization signal block (SSB); and
based on the one or more monitoring occasions, receiving downlink control channel spatial information using the first beam,
wherein the SSB is received using a second beam and the physical downlink control channel (PDCCH) transmission is received using the first beam, wherein the first beam and the second beam are received from a same direction and the SSB and PDCCH transmission are quasi co-located with respect to spatial quasi co-location parameters.

17. The computer readable storage medium of claim 16, wherein the one or more monitoring occasions are configured using radio resource control (RRC) signaling.

18. The computer readable storage medium of claim 16, the operations further comprising activating or deactivating grant free resources based on downlink control information.

19. The computer readable storage medium of claim 16, the operations further comprising obtaining time and frequency resources for grant free transmission based on downlink control information.

20. The computer readable storage medium of claim 16, the operations further comprising transmitting control signaling for a grant free resource in uplink control information, wherein the transmission comprises user equipment identifier.

* * * * *